United States Patent
Shiomi et al.

(10) Patent No.: US 7,106,370 B2
(45) Date of Patent: Sep. 12, 2006

(54) SIGNAL DIFFERENCE CORRECTION OF PICTURE SIGNALS READ FROM MULTIPLE READOUT TYPE IMAGE SENSING DEVICE

(75) Inventors: Yasuhiro Shiomi, Tokyo (JP); Toshio Matsumoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1016 days.

(21) Appl. No.: 09/972,995

(22) Filed: Oct. 10, 2001

(65) Prior Publication Data

US 2002/0044779 A1    Apr. 18, 2002

(30) Foreign Application Priority Data

Oct. 12, 2000  (JP) ............................. 2000-312375
Nov. 1, 2000   (JP) ............................. 2000-334899

(51) Int. Cl.
- H04N 5/217  (2006.01)
- H04N 5/225  (2006.01)
- H04N 5/228  (2006.01)
- H04N 5/235  (2006.01)

(52) U.S. Cl. ................ 348/241; 348/218.1; 348/222.1; 348/230.1

(58) Field of Classification Search ............. 348/218.1, 348/222.1, 229.1, 230.1, 234, 241, 243, 266, 348/267, 362–364; 358/504, 514

See application file for complete search history.

(56) References Cited

U.S. PATENT DOCUMENTS

| | | | |
|---|---|---|---|
| 5,515,102 A * | 5/1996 | Pearsall et al. ............. 348/241 |
| 5,737,015 A   | 4/1998 | Juen ............................ 348/230 |
| 6,072,603 A * | 6/2000 | Parks ......................... 358/504 |
| 6,101,287 A   | 8/2000 | Corum et al. ............... 382/274 |
| 6,337,713 B1 * | 1/2002 | Sato ............................ 348/311 |
| 6,608,648 B1 * | 8/2003 | Bean ......................... 348/211.7 |
| 6,791,608 B1 * | 9/2004 | Miyazawa ................... 348/246 |
| 2001/0022858 A1 | 9/2001 | Komiya et al. ............. 382/274 |

FOREIGN PATENT DOCUMENTS

| | | |
|---|---|---|
| EP | 1 037 458 | 9/2000 |
| JP | 64-085483 | 3/1989 |
| JP | 3-085972  | 4/1991 |

(Continued)

OTHER PUBLICATIONS

European Search Report dated Feb. 15, 2002 (Ref. No. 2789930).

(Continued)

*Primary Examiner*—Ngoc-Yen Vu
*Assistant Examiner*—Dan Pasiewicz
(74) *Attorney, Agent, or Firm*—Fitzpatrick, Cella, Harper & Scinto

(57) ABSTRACT

An image sensing apparatus includes an image sensing device having an image sensing section which is divided into a plurality of image sensing sections and generates electric signals corresponding to amounts of incident light and a plurality of output units respectively outputting the electric signals of the plurality of image sensing sections, a shutter which can open and close an optical path of incoming light to the image sensing device, and LEDs for emitting light to at least a part of the image sensing area of the image sensing device so that the light is projected onto the plurality of image sensing sections. Signal difference between the plurality of output units is corrected on the basis of the correlation of image signals obtained while turning on LEDs with screening the optical path to the image sensing device by the shutter.

20 Claims, 18 Drawing Sheets

FOREIGN PATENT DOCUMENTS

| | | |
|---|---|---|
| JP | 6-141246 | 5/1994 |
| JP | 7-038812 | 2/1995 |
| JP | 7-38812 | 2/1995 |
| JP | 7-38814 | 2/1995 |
| JP | 7-75023 | 3/1995 |
| JP | 10-276976 | 10/1998 |
| JP | 10-336529 | 12/1998 |

OTHER PUBLICATIONS

Japanese Office Action dated Nov. 25, 2003, which was issued in corresponding Japanese Patent Application No. 2000-312375.

* cited by examiner

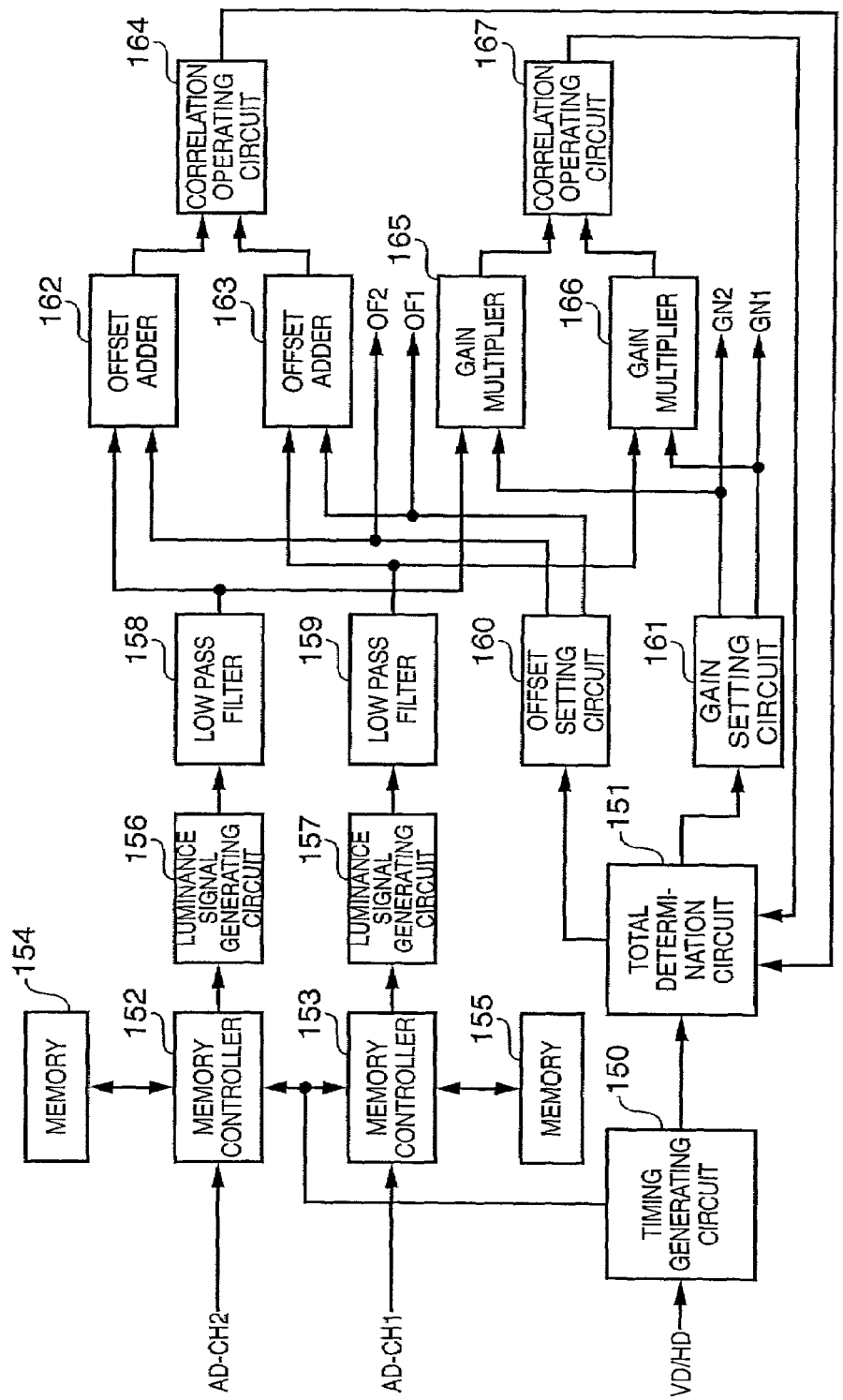

GRAPH A

GRAPH B

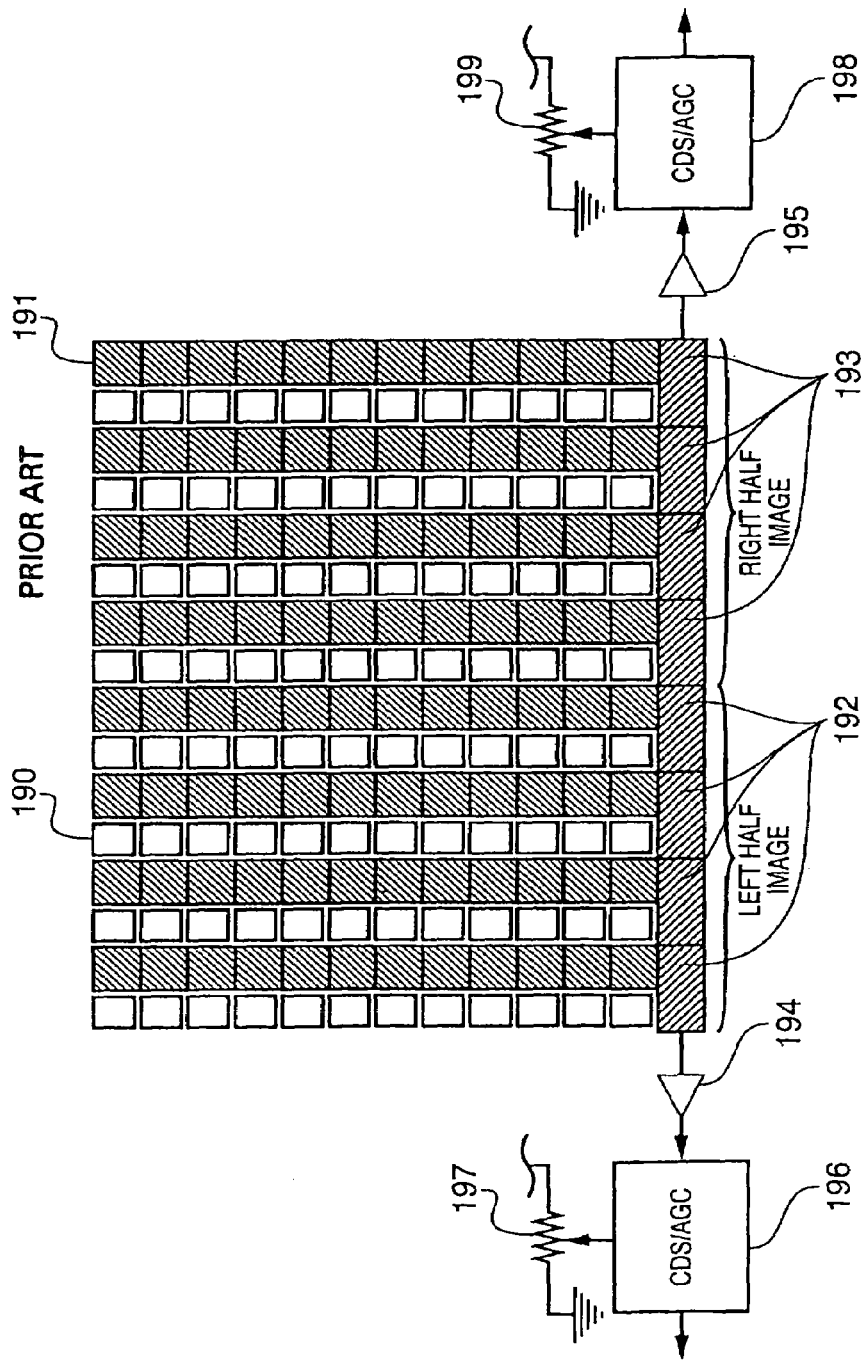

SIGNAL DIFFERENCE CORRECTION OF PICTURE SIGNALS READ FROM MULTIPLE READOUT TYPE IMAGE SENSING DEVICE

FIELD OF THE INVENTION

The present invention relates to an image sensing apparatus, a control method thereof, and a signal processing method, and in particular, to an image sensing apparatus, a control method thereof, and a signal processing method that can determine output levels of a plurality of outputs and can correct the signal difference among them when an image sensing device in an image sensing apparatus such as a digital camera has a structure where an image sensing area thereof is divided into a plurality of image sensing areas and data is read from each area.

BACKGROUND OF THE INVENTION

A structural example of a conventional digital still camera will be described with reference to FIG. 17.

In this figure, when a user operates a camera operation switch 201 (consists of a main switch, a release switch, etc. in a camera), a total control CPU 200 detects a state change of the camera operation switch 201, and supplies power to respective circuit blocks.

An image of an object within an imaging area is formed on an image sensing device 204 through main image sensing optical systems 202 and 203, and is converted into an analog electric signal. The analog electric signal from the image sensing device 204 is processed by a CDS/AGC circuit 205 in analog, converted into a predetermined signal level, and furthermore, sequentially converted into a digital signal in an A/D converter 206 pixel by pixel.

A driver circuit 207 controls the horizontal and vertical operation of the image sensing device 204 in a predetermined manner on the basis of a signal from a timing generator 208 which determines the entire operation timing, thereby an image sensing device 204 outputs an image signal.

Similarly, the CDS/AGC circuit 205 and the A/D converter 206 also operate on the basis of the timing provided by the timing generator 208.

Reference numeral 209 denotes a selector that selects a signal on the basis of a signal from the CPU 200. An output from the A/D converter 206 is inputted into a memory controller 215 through a selector 209, and all signal outputs are transmitted to a frame memory 216. Therefore, since all the pixel data of every image sensing frame are temporarily stored in the frame memory 216 in this case, all the pixel data of photographed images are written in the frame memory 216 in continuous shooting and the like.

After writing into the frame memory 216, by the control of the memory controller 215, the contents of the frame memory 216 storing pixel data are transmitted to a camera digital signal processing unit (DSP) 210 through a selector 209. In the camera DSP 210, R, G and B signals are generated based on each pixel data of each image stored in the frame memory 216.

Usually, before image sensing, a monitor display 212 performs finder display etc. by periodically transmitting the generated R, G and B signals to video memory 211 (every frame).

When a user directs recording of an image by operating the camera operation switch 201, each pixel data for one frame is read from the frame memory 216 in response to a control signal from the CPU 200, and after performing image processing in the camera DSP 210, each pixel data is temporarily stored in work memory 213.

Then, the data in the work memory 213 is compressed in a compression/decompression section 214 on the basis of a predetermined compression format, and the compressed data is stored in external nonvolatile memory 217 (usually, nonvolatile memory such as flash memory is used).

Further, when observing photographed image data, data that is compressed and stored in the external memory 217 is decompressed to the normal data of every pixel by the compression/decompression section 214. The user can observe a photographed picture on the monitor display 212 by transmitting the decompressed data of every pixel to the video memory 211.

Thus, a usual digital camera has such structure that an output from the image sensing device 204 is converted into image data through a signal processing circuit at almost real time, and the result is outputted to memory or a monitor circuit.

In a digital camera system like the above, in order to improve performance, such as continuous shooting (for example, to achieve a rate of 10 frames/sec), it is necessary to improve the system itself, including an image sensing device, such as to increase reading speed from the image sensing device and to increase writing speed of data from image sensing device into frame memory etc.

As one of improvement methods therefor, FIG. 18 briefly shows the structure of a two-output type device in which a horizontal CCD, which is an image sensing device such as a CCD, is divided into two regions, and signals are outputted by each region.

In the CCD shown in FIG. 18, charges of the respective pixels generated in photo diode sections 190 are transmitted to vertical CCDs 191 all at once at certain predetermined timing. Then, the charges in the vertical CCDs 191 are transmitted to the horizontal CCDs 192 and 193 in every line at the next timing.

In the structure shown in FIG. 18, the horizontal CCD 192 transmits the charges toward an amplifier 194 on the left-hand side at every transfer clock. Further, the horizontal CCD 193 transmits the charges toward an amplifier 195 on the right-hand side at every transfer clock. Thus, the image data of this CCD is read out in such a manner that the image is divided into right and left areas bordering on the center of a screen.

Usually, the amplifiers 194 and 195 are formed within a CCD device. Nevertheless, since they are considerably apart from each other in layout, the relative characteristics of both amplifiers 194 and 195 do not necessarily completely coincide. For this reason, signal levels of the right and left outputs are matched by adjusting external adjusting sections 197 and 199 when the outputs from the amplifiers 194 and 195 are processed by separate CDS/AGC circuits 196 and 198, respectively.

As described above, a method for simultaneously reading signals from a plurality of output channels to realize an image sensing device capable of performing high-speed readout is indispensable technology so as to bring future digital cameras further close to silver halide cameras (products with the specification of 8 frames/sec have already realized in silver halide cameras of a single-lens reflex type).

However, although a plurality of output channels are advantageous in speed, the plurality of output channels are apparently disadvantageous, in comparison with a one-output channel, in the matching property of output levels.

With a simple manually adjusting method such as analog adjustment in a conventional CDS/AGC circuit section, and digital adjustment which adjust output levels of both channels to match each other after A/D conversion, even if the adjustment is closely made in manufacturing processes, a value of, e.g., a VR resistor changes in according with environmental conditions. Further, the possibility that temperature characteristics of the two CDS/AGC circuits perfectly coincides with each other is very rare.

Usually, if the relative precision between the right and left output channels exceeds ±1% when such a method of reading an image sensing device is performed, the imbalance of their boundary is clearly seen on a screen.

Another method of increasing the resolution of an image while improving the continuous shooting capability of a camera is disclosed in Japanese Patent Laid-Open No. 6-141246. This patent application discloses a method of sensing an image using a plurality of different image sensing devices, each senses a part of the image, then generating a single image by combining the partial images output from the plurality of image sensing devices.

In this method, the image sensing devices are arranged so that adjoining partial images, sensed by the image sensing devices, may overlap to some extent with each other. A seam is not conspicuous after combining the plurality of partial images by performing image processing so that outputs corresponding to this overlapped portion may match with each other.

Since an overlap occurs among a plurality of partial images in the above-described method, it is easy to achieve uniformity as an entire image so long as the correlation in the overlapped portion can be determined. However, image data obtained by using an image sensing device, as described in FIG. 18, having the plurality of output channels does not include any overlap portion between the divided images, in principle, therefore, it is not possible to adopt the above-described image processing method.

SUMMARY OF THE INVENTION

The present invention has been made in consideration of the above situation, and has as its object to highly accurately correct the signal difference among a plurality of outputs when an image sensing device with a plurality of output channels is used.

According to the present invention, the foregoing object is attained by providing an image sensing apparatus comprising: an image sensing device having an image sensing area which is divided into a plurality of image sensing sections and generates electric signals corresponding to amounts of incident light, and a plurality of output units respectively outputting the electric signals of the plurality of image sensing sections; a shutter which can open and close an optical path of incoming light to the image sensing device; and a light source which emits light to at least a part of the image sensing area of the image sensing device so that the light is projected onto the plurality of image sensing sections.

According to the present invention, the foregoing object is also attained by providing a control method for an image sensing apparatus that comprises an image sensing device having an image sensing area which is divided into a plurality of image sensing sections and generates electric signals corresponding to amounts of incident light and a plurality of output units respectively outputting the electric signals of the plurality of image sensing sections, a shutter which can open and close an optical path of incoming light to the image sensing device, and a light source which emits light to at least a part of the image sensing area of the image sensing device so that the light is projected onto the plurality of image sensing sections, comprising: a screening step of screening an optical path of incoming light by the shutter; a light emitting step of emitting light by the light source with the optical path screened; and a determining step of determining correlation between electric signals that are obtained by emitting light in the light emitting step and are outputted by the plurality of output units.

Further, the foregoing object is also attained by providing an image sensing apparatus comprising: an image sensing device having an image sensing area which is divided into a plurality of image sensing sections and generates electric signals corresponding to amounts of incident light, and a plurality of output units respectively outputting electric signals of the plurality of image sensing sections; and a determination unit that determines correlation of the electric signals outputted by the plurality of output units, wherein the electric signals comprises electric signals produced by emitting light to an area, which crosses over the plurality of image sensing sections and is at least a part of the image sensing area, while screening incoming light into the plurality of image sensing sections.

Furthermore, the foregoing object is also attained by providing a signal processing method for processing signals obtained from an image sensing device having an image sensing area which is divided into a plurality of image sensing sections and generates electric signals corresponding to amounts of incident light and a plurality of output units respectively outputting the electric signals of the plurality of image sensing sections, comprising: a determining step of determining correlation between electric signals that are obtained by emitting light to an area, which crosses over the plurality of divided sections and is at least a part of the image sensing area while screening incoming light into the image sensing sections, and that are outputted from the plurality of output units.

Further, the foregoing object is also attained by providing an image sensing apparatus comprising: an image sensing device having an image sensing area which is divided into a plurality of image sensing sections each of which has a plurality of pixels that generate electric signals corresponding to amounts of incident light, and a plurality of output units respectively outputting the electric signals of the plurality of image sensing sections; a shutter which can open and close an optical path of incoming light to the image sensing device; and a correction unit to correct difference in levels between the electric signals obtained from the plurality of image sensing sections with the optical path being opened by the shutter on the basis of the electric signals outputted from the plurality of image sensing sections with screening the optical path by the shutter.

Further, the foregoing object is also attained by providing a correction method for correcting difference of levels between electric signals outputted from an image sensing device that has an image sensing area divided into a plurality of image sensing sections each of which has a plurality of pixels that generate electric signals corresponding to amounts of incident light, and outputs the electric signals from the plurality of image sensing sections, comprising: a correction step of correcting difference in levels between the electric signals obtained from the plurality of image sensing sections with the optical path being opened to the image sensing sections on the basis of electric signals outputted from the plurality of image sensing sections with screening the optical path to the image sensing sections.

Further, the foregoing object is also attained by providing an image sensing apparatus comprising: an image sensing area having a plurality of pixels that generate electric signals corresponding to amounts of incident light; a shutter that can open and close an optical path of incoming light to the image sensing area; a light source for emitting light to at least a part of the image sensing area; and a correction unit to correct an electric signal obtained from the image sensing area with the optical path being opened by the shutter on the basis of an electric signal outputted from the image sensing area while light is emitted by the light source with screening the optical path by the shutter.

Further, the foregoing object is also attained by providing a correction method for correcting electric signals outputted from an image sensing area which is divided into a plurality of image sensing sections having a plurality of pixels which generate electric signals corresponding to amounts of incident light, comprising: a correction step of correcting electric signals obtained from the image sensing sections with an optical path being opened to the image sensing sections on the basis of electric signals outputted from the image sensing sections with screening the optical path to the image sensing sections and emitting light to at least a part of the image sensing sections.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a block diagram showing the structure of an imbalanced amount calculating circuit according to a sixth embodiment of the present invention;

FIG. 18 is a schematic diagram showing a principle of the readout of a conventional image sensing device.

DETAILED DESCRIPTION OF THE PREFERRED EMBODIMENTS

Preferred embodiments of the present invention will be described in detail in accordance with the accompanying drawing.

[First Embodiment]

Figure 1:
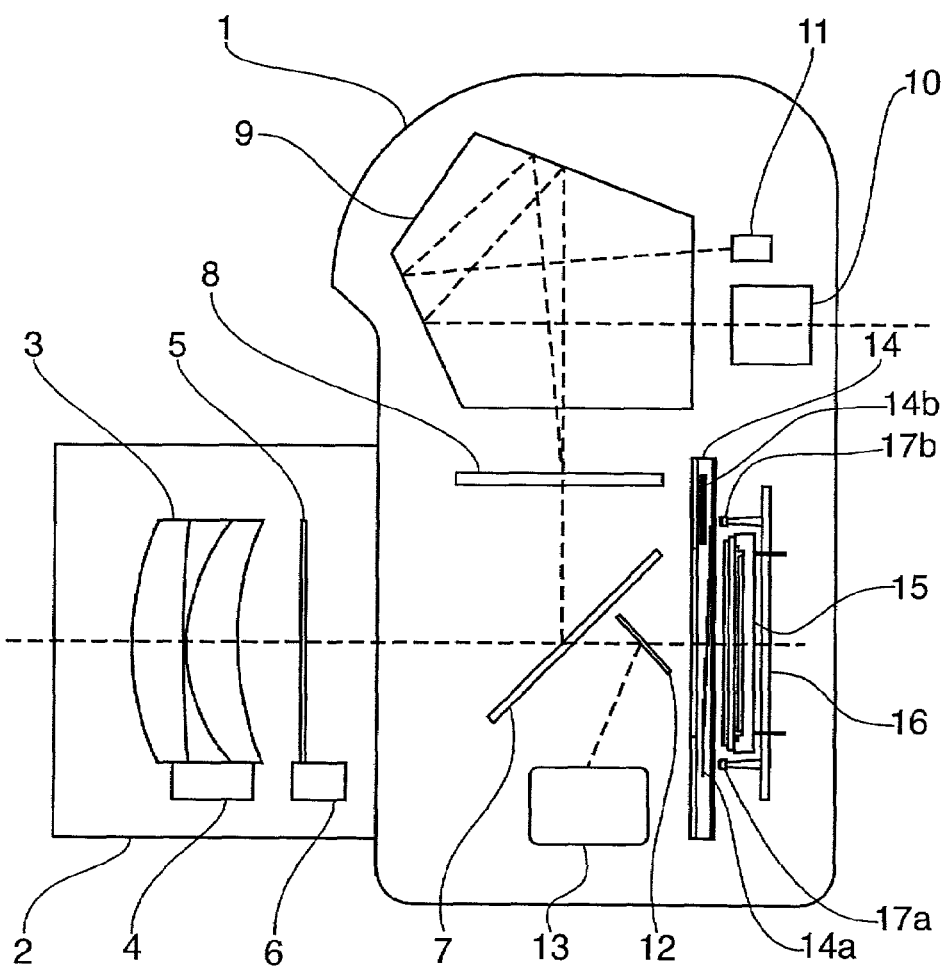
FIG. 1 is a schematic sectional view of an electronic camera according to a first embodiment of the present invention.
Figure 2:
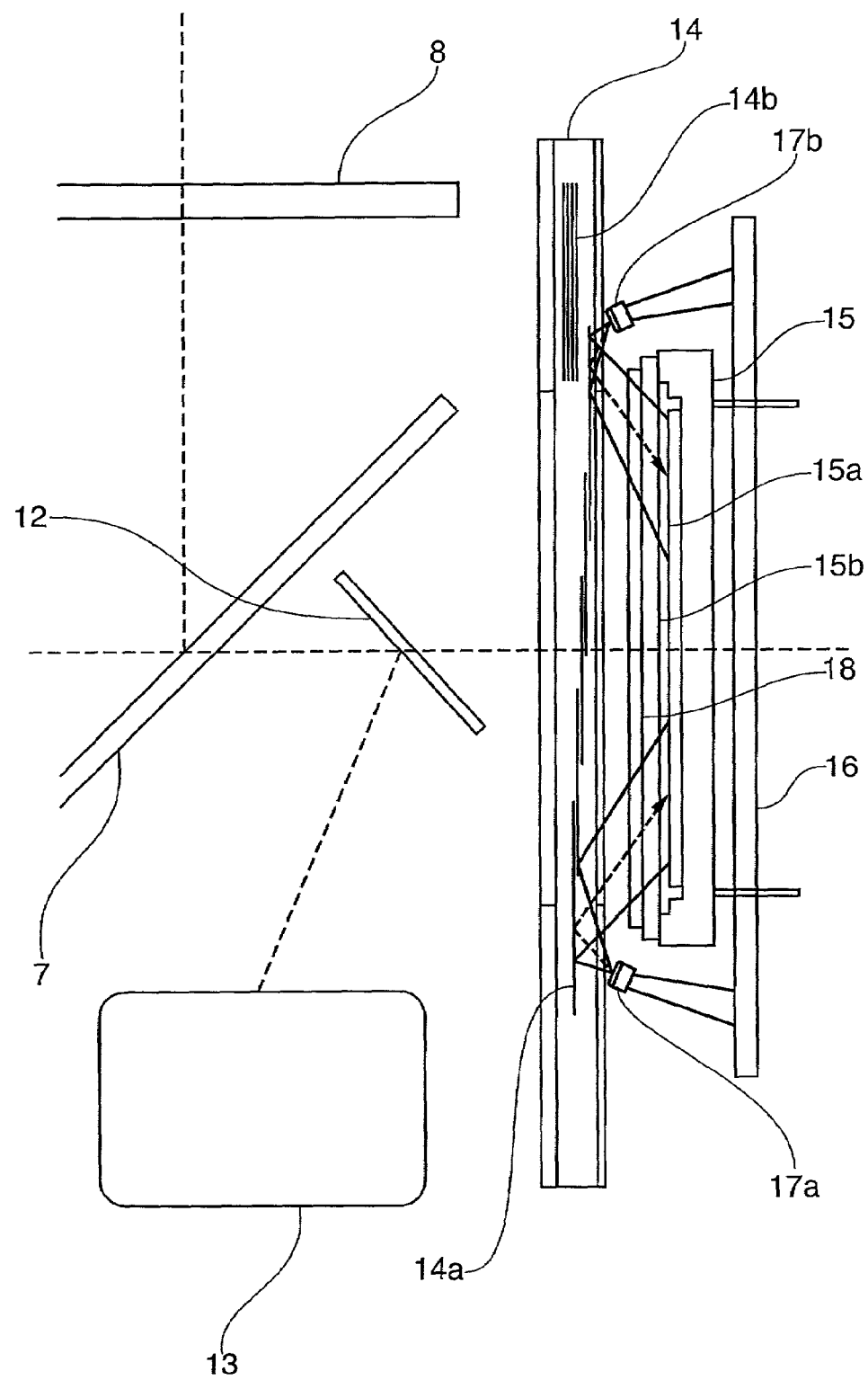
FIG. 2 is a partially enlarged view of the electronic camera shown in FIG. 1.

FIGS. 1 and 2 are schematic diagrams for describing an electronic camera in a first embodiment of the present invention. Namely, FIG. 1 is a schematic cross sectional view of the structure of an entire camera viewed from its side, and FIG. 2 is an enlarged view of a shutter apparatus 14 (will be described later) in the camera shown in FIG. 1.

In FIG. 1, reference numeral 1 denotes a electronic still camera, and reference numeral 2 denotes an image sensing lens system 2 that projects an image of an object formed on an image-formation plane, and the lens system 2 is designed detachable from the electronic still camera 1. The lens system 2 has an imaging lens 3 for projecting the image of the object formed on the image-formation plane, and a lens driving mechanism 4 for driving the imaging lens 3. Furthermore, the lens system 2 includes aperture blades 5 for performing exposure control, and an aperture driving mechanism 6 for driving the aperture blades 5. In addition, although simplified in the drawing, the lens system 2 has one or more lenses and can be single focus (fixed focus) lens system, or a variable focus lens system, such as a step zoom lens system.

A main mirror 7 directs luminous flux of an image of an object passing through the lens system 2 to a focusing screen 8, and projects a part of the luminous flux of the image penetrated to further directs a part of the luminous flux of the image to a focus detecting unit 13 through a sub mirror 12 (will be described later). The main mirror 7 is movably constituted, by a mirror driving mechanism (not shown), between a position where an image of an object can be observed from a finder and a position outside of the optical path of a luminous flux at the time of image sensing operation.

Reference numeral 8 denotes a focusing screen 8, where the luminous flux of an image of an object projected by the lens system 2 is formed after being reflected by the main mirror 7, and at the time of finder observation, the image of the object is formed on the focusing screen 8.

An optical member 9 reflects an image of an object, formed on the focusing screen 8, thereby converting it into a correct image, and in this embodiment, consists of a pentaprism. An eyepiece unit 10 projects the image of the object, which is reflected and converted into the correct image by the pentaprism 9, reach the user's eye.

A photometry unit 11 measures the brightness of the image of the object, formed on the focusing screen 8 through the pentaprism 9 at the time of finder observation. The electronic still camera 1 according to this embodiment is constituted so that an exposure control at the time of exposure may be performed on the basis of an output signal of the photometry unit 11.

A sub mirror 12 reflects the luminous flux of an image of an object penetrated through the main mirror 7, and projects the luminous flux to the focus detecting unit 13 which is arranged on the bottom surface of a mirror box (not shown).

The sub mirror 12 is interlocked with the main mirror 7, and a mirror driving mechanism (not shown) of the main mirror 7. The sub mirror 12 is movably constituted so that the sub mirror 12 is moved to the position where the luminous flux is projected to the focus detecting unit 13 when the main mirror 7 is in the position where the user can observe the image of the object through the finder, and to the position outside of an optical path of the luminous flux at the time of image sensing operation.

Reference numeral 13 denotes the focus detecting unit 13, and the lens driving mechanism 4 of the lens system 2 is controlled on the basis of the output signal of the focus detecting unit 13, and focus control is performed by driving the imaging lens 3.

A shutter unit 14 controls the incidence of the luminous flux of an image of an object on an imaging plane. This shutter unit 14 is a focal plane shutter having front blades 14a and rear blades 14b. The front blades 14a screen the luminous flux at the time of finder observation and move outside of the optical path of the luminous flux in response to a release signal at the time of image sensing operation to start exposure. In addition, the rear blades 14b screen the luminous flux of the image at predetermined timing after the movement of the front blades 14a starts at the time of image sensing operation, while being out of the optical path of the luminous flux at the time of finder observation. Furthermore, a notch or a through hole for emitting the luminous flux emitted by LED devices 17a and 17b, which are described later, to the front blades 14a is formed near an aperture of the shutter unit 14.

An image sensing device 15 is used for taking the optical image of the object formed by the lens system 2, and converts the optical image of the object into an electrical signal. A well-known two-dimensional type image sensing device is used for the image sensing device 15. There are various types of image sensing devices, such as CCD type, MOS type, and CID type image sensing devices, and any type of image sensing devices can be adopted. It is assumed that, in this embodiment, an interline type CCD image sensor is used having photoelectric conversion elements (photo sensors) arranged in two dimensions, and signal charges accumulated in the respective sensors are outputted through a vertical transfer path and a horizontal transfer path. In addition, the image sensing device 15 has a so-called electronic shutter function which controls accumulation time (shutter time) of the charges accumulated in each sensor.

Figure 3:
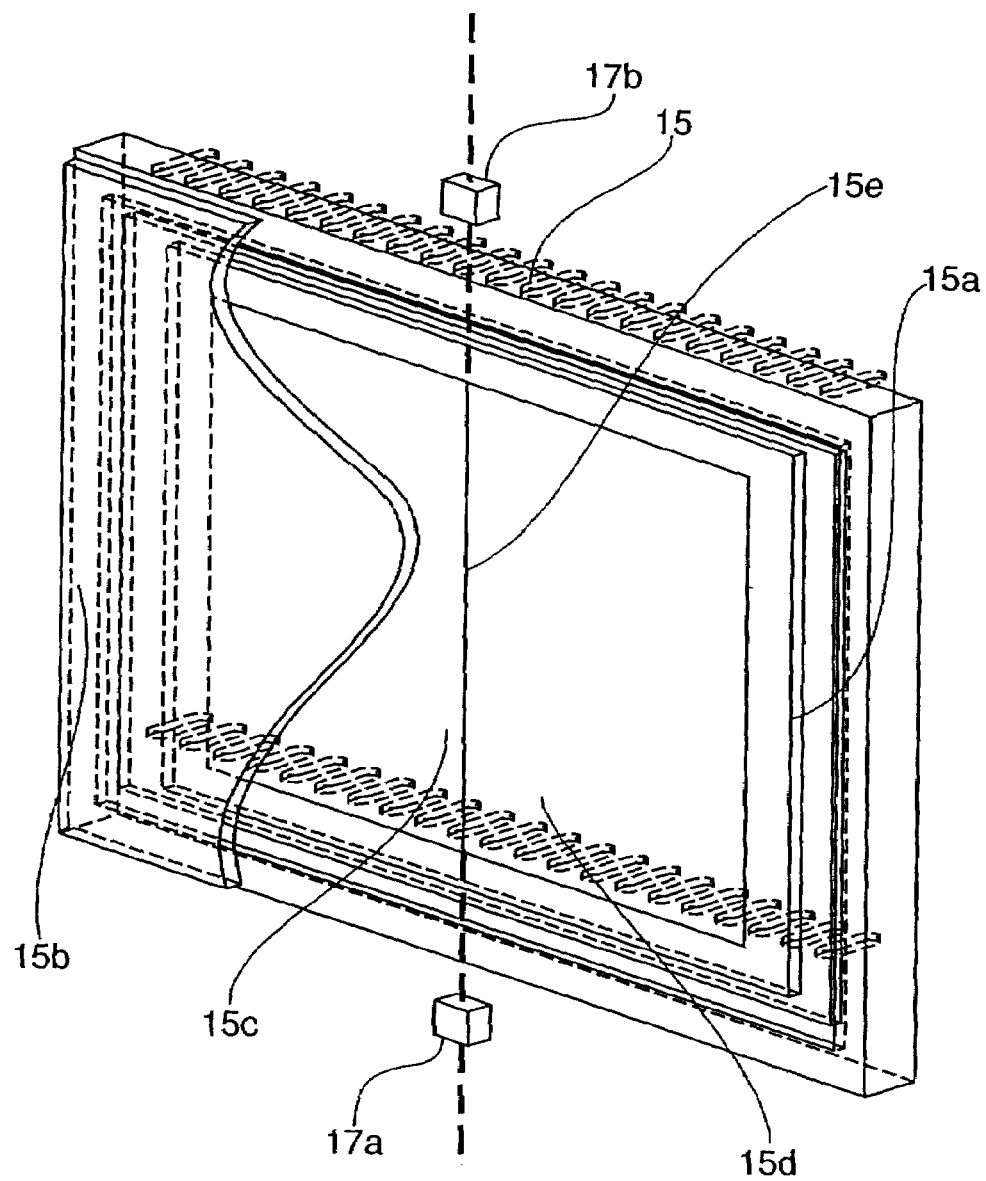
FIG. 3 is a perspective view of an image sensing device and the vicinity thereof according to the first embodiment of the present invention.

As shown in FIG. 3, a cover glass 15b, an optical protection member that protects the entire image sensing area 15a, protects the image sensing device 15. In addition, the image sensing device 15 is also constituted so that charges accumulated in the image sensing device 15 are separately and concurrently outputted for a right half area 15d and a left half area 15c, and each of the divided areas 15c and 15d is formed of a plurality of pixels, which generate electrical signals in responsive to the incident light, arranged in two dimensions.

An electric substrate 16 electrically and mechanically combines the image sensing device 15, and the LEDs 17a and 17b described later, and supports them.

Light sources 17a and 17b emit light to the image sensing area 15a of the image sensing device 15, and comprise the LED devices in the present invention. As shown in FIGS. 2 and 3, the LED devices 17a and 17b are arranged near the upper and lower sides of the image sensing device 15, and on the extension line of a parting line 15e which divides the image sensing area 15a into the right half area 15d and left half area 15c. At the same time, the LED devices 17a and 17b are arranged so that the LED devices 17a and 17b may emit light with radiation faces of the LED devices 17a and 17b facing to the shutter unit 14.

Figure 4:
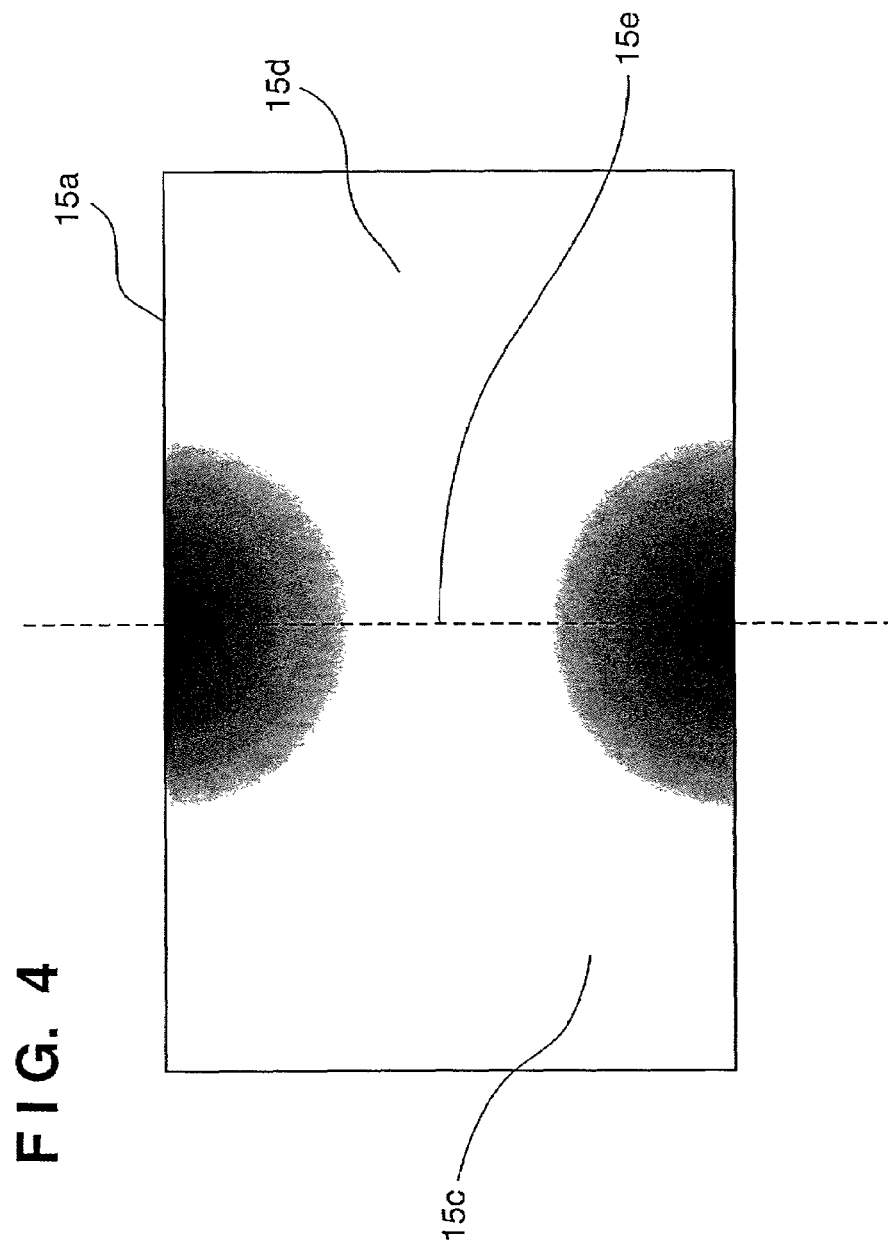
FIG. 4 is a drawing of a lighting status in an image sensing area of the image sensing device according to the first embodiment of the present invention.

The luminous flux emitted by the LED devices 17a and 17b is incident on the image sensing area 15a of the image sensing device 15 after being reflected by the front blades 14a of the shutter unit 14, with the surface facing the image sensing device 15 being a reflection surface. FIG. 4 shows a state of light-emission by the LED devices 17a and 17b onto the image sensing area 15a of the image sensing device 15. As shown in this figure, the luminous flux emitted by the LED devices 17a and 17b is incident on the right half area 15d and left half area 15c of the image sensing area 15a of the image sensing device 15 approximately symmetrically.

Usually, reflective prevention coating is applied for preventing fogging on a film, which is caused by stray light, to a front blade of a shutter unit in a camera which uses a silver halide film as a recording medium. However, an electronic still camera according to this embodiment is constituted so that exposure time control is realized by controlling accumulation time (shutter time) of charges accumulated in the respective sensors by the electronic shutter function of the image sensing device 15. Hence, since the front blades 14a is in an open state at the start of accumulation in the image sensing device 15, the reflective prevention coating on the front blades 14a for preventing fogging on the image sensing area by the stray light becomes unnecessary.

Therefore, in order to efficiently project the luminous flux emitted by the LED devices 17a and 17b to the image sensing area 15a of the image sensing device 15, it is desirable that the front blades 14a of the shutter unit 14 in the electronic still camera 1 according to the first embodiment comprises a material with a high reflectance. Alternatively, it is desirable to coat the front blades 14a with a high reflectance paint, plate the front blades 14a, etc. as surface treatment. In addition, in order to illuminate the image sensing area 15a of the image sensing device 15 as broad as possible, it is desirable to give diffusion characteristics to the front blades 14a of the shutter unit 14. The surfaces of the front blades 14a that face the image sensing device 15 is coated with semigloss white tone paint or semigloss gray tone paint in this embodiment in order to achieve the above-described two conditions. However, it is possible to obtain a sufficient lighting effect so long as one of the conditions is fulfilled.

It should be noted that, in this embodiment, the image sensing area 15a is illuminated by the raw luminous flux emitted by the LED devices 17a and 17b. However, a mask member having a predetermined pattern and an optical member for forming this pattern on the image sensing area 15a may be arranged near the radiation faces of the LED devices 17a and 17b, so that light of the predetermined pattern may be incident instead of direct light.

As shown in FIG. 2, in the first embodiment, the LED devices 17a and 17b are supported and electrically connected by the electric substrate 16 which is a supporting member of the image sensing device 15. Nevertheless, the supporting members of the LED devices 17a and 17b may be formed on the shutter unit 14, a camera body (not shown), etc., and electrical connection may be realized by connecting the LED devices 17a and 17b to the electric substrate 16 or another circuit board, which is not shown, with a flexible printed circuit board, lead wires, etc.

A filter member 18 removes high frequency components of the image sensing light that causes noise, and is supported integrally on the cover glass 15b of the image sensing device 15. The filter member 18 is made of materials with birefringent characteristics, such as crystal and a lithium niobate.

Figure 5:
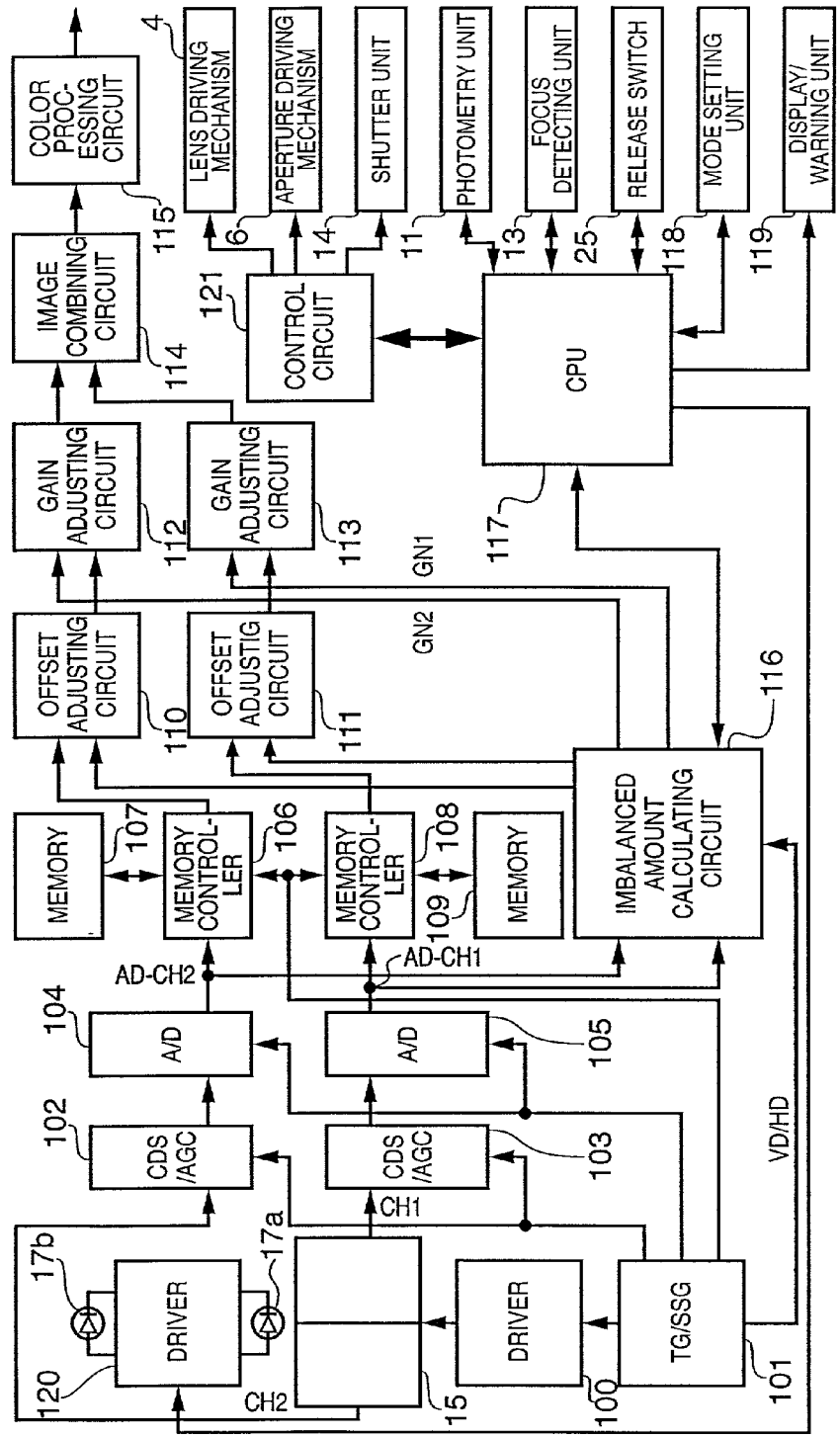
FIG. 5 is a block diagram showing the entire system configuration according to the embodiment of the present invention.

FIG. 5 is a block diagram showing the entire hardware structure of the above-described electronic still camera 1 according to the first embodiment.

The electronic still camera 1 mainly has the lens driving mechanism 4 which drives the lens system 2, the aperture driving mechanism 6, the shutter unit 14, the image sensing device 15, and a processing circuit group which processes an output signal from the image sensing device 15, an imbalanced amount calculating circuit 116, a control circuit 121, a central processing unit (CPU) 117.

The CPU 117 is connected with the photometry unit 11, focus detecting unit 13, control circuit 121, and imbalanced amount calculating circuit 116, a driver 120 which drives the LED device 17a and 17b, a mode setting unit 118 that sets up a calibration mode of whether the LED devices 17a and 17b emit light to the image sensing device 15, a display/warning unit 119, and the like. The CPU 117 performs various calculation for obtaining values such as an exposure value and a focal position of the lens system 2 according to predetermined algorithm, and totally manages automatic exposure control, auto-focusing, auto flash, auto white balance, etc. In addition, the CPU 117 controls a corresponding circuit on the basis of incoming signals of various types inputted from a control unit of a release button, which is not shown, or the mode setting unit 118. When the calibration mode of the image sensing device 15 is set by the mode setting unit 118, the CPU 117 turns on the LED devices 17a and 17b for calibration using the driver 120 to project light on the image sensing device 15. In addition, a release switch 25 makes the shutter unit 14 operate.

An output signal of the photometry unit 11 is passed to the CPU 117, and an exposure control value that shows the exposure time is computed in the CPU 117. Then, the obtained exposure control value is passed to the control circuit 121 from the CPU 117, and automatic exposure control, and the control of auto flash, auto white balance, etc. are performed through the control circuit 121.

On the basis of the exposure control value passed from the CPU 117, the control circuit 121 controls a driver of the image sensing device 15, controls the open and close timing, etc. of the shutter unit 14, and controls the aperture driving mechanism 6 at the time of exposure.

In the above-described structure, luminous flux of an image of an object that penetrates the lens system 2 is regulated by quantity of light with the aperture blades 5 and shutter unit 14 to be incident on the image sensing device 15.

As described above with reference to FIG. 3, it is possible that the image sensing device 15 simultaneously outputs respective signals of the right half area 15d and left half area 15c (CH1 and CH2). The image sensing device 15 with these two output channels operates at a predetermined frequency by being driven by a driver 100, and outputs the sensed image data separately in a mode of vertically dividing an entire image into two pieces, that is, right and left half areas (15d, 15c). In addition, a TG/SSG 101 is a timing generating circuit that outputs a vertical synchronizing signal VD and a horizontal synchronizing signal HD, and simultaneously supplies a timing signal to each circuit block.

An image of the right half area 15d of the image sensing device 15 is inputted into a CDS/AGC circuit 103 through a CH1 output terminal. Then, by performing processing such as a known correlative double sampling etc. here, reset noise included in the output from the CCD and the like is removed, and the output is amplified to a predetermined signal level. A signal AD-CH1 can be obtained after the output signal after this amplification is converted into a digital signal in an A/D conversion circuit 105.

Similarly, an image of the left half area 15c of the image sensing device 15 is inputted into a CDS/AGC circuit 102 through a CH2 output terminal. Then, similarly, by performing processing such as a known correlative double sampling etc. here, reset noise included in the output from the CCD and the like is removed, and the output is amplified to a predetermined signal level. A signal AD-CH2 can be obtained after the output signal after this amplification is converted into a digital signal in an A/D conversion circuit 104.

In this way, the both signals AD-CH1 and AD-CH2 that are separately converted into the digital data are sequentially stored in memory 109 and 107 through memory controllers 108 and 106 respectively.

In addition, when the calibration mode described later is set, the signals AD-CH1 and AD-CH2 are simultaneously inputted also into the imbalanced amount calculating circuit 116. Furthermore, an imbalanced amounts of the both signals are calculated with a method describing later, and the optimal amount of correction is simultaneously determined and stored.

Since the memory controllers 106 and 108 can usually perform reading and writing from/to memory 107 and 109 continuously in time sharing, it is possible to write the signals from the image sensing device 15 in the memory 107 and 109, while reading data, written in the memory 107 and 109, at different timing in the order in which the data were written.

First, as for a signal from the CH1 output terminal of the image sensing device 15, data is continuously read from the memory 109 under the control of the memory controller 108, and is inputted into an offset adjusting circuit 111. Here, a predetermined OF1 that is calculated and set in the imbalanced amount calculating circuit 116 is inputted into the other input terminal of the offset adjusting circuit 111, and both signals are added inside the offset adjusting circuit 111.

Next, an output of the offset adjusting circuit 111 is inputted into a gain adjusting circuit 113, and a predetermined gain GN1 which is calculated and set in the imbalanced amount calculating circuit 116 is inputted into the other input terminal of the gain adjusting circuit 113. Then, both signals are multiplied inside the gain adjusting circuit 113.

Similarly, as for a signal from the CH2 output terminal of the image sensing device 15, data is continuously read from the memory 107 under the control of the memory controller 106, and is inputted into an offset adjusting circuit 110. Here, a predetermined offset OF2 that is calculated and set in the imbalanced amount calculating circuit 116 is inputted into the other input terminal of the offset adjusting circuit 110, and both signals are added inside the offset adjusting circuit 116.

Next, an output of the offset adjusting circuit 110 is inputted into a gain adjusting circuit 112, here, a predetermined gain GN2 which is calculated and set in the imbalanced amount calculating circuit 116 is inputted into the other input terminal of the gain adjusting circuit 112, and both signals are multiplied inside the gain adjusting circuit 112.

Thus, the image data output after the imbalanced amount calculating circuit 116 corrects the imbalanced amount produced between two channels is converted into data of a signal image in the image combining circuit 114 (i.e., the right and left images are combined to a single image). Then, predetermined color processing (color interpolation processing, gamma conversion, etc.) is performed in a color processing circuit 115.

Next, described is the control, in the calibration mode, which is needed at the time of combining the right and left images for computing the correction amount by the imbalanced amount calculating circuit 116 according to the first embodiment.

In the state where a user sets the calibration mode with the mode setting unit 118 and the CPU 117 detects the state set in the mode setting unit 118, the CPU 117 directs to the imbalanced amount calculating circuit 116 that a mode is set to the calibration mode while directing the driver 120 to turn on the LED devices 17a and 17b for calibration for a predetermined period. The LED devices 17a and 17b emit light to the image sensing device 15 under control of the driver 120. The image sensing device 15 starts accumulation of an image (FIG. 4) of the illumination light according to the lighting period of the LED devices 17a and 17b. Then, the image sensing device 15 outputs image signals to the CDS/AGC circuits 103 and 102 through the output terminals CH1 and CH2, and the output signal is processed as described above. In addition, the imbalanced amount calculating circuit 116 computes the imbalanced amount of the image (FIG. 4) of the illumination light emitted by the LED devices 17a and 17b with a below-described method, and determines an adequate correction amount. Furthermore, the imbalanced amount, correction amount, etc. that are computed are stored in the memory mounted in the imbalanced amount calculating circuit 116.

The camera 1 has a structure to notify a user, using a display/warning unit 119, that adequate calibration cannot be performed, if it is determined that there is apparent abnormality in the image outputted from the image sensing device 15 at this time, for example, if no signal is obtained from a portion currently illuminated by the light emitted by the LED devices 17a and 17b. Therefore, in consequence, the user can recognize certain abnormalities (a failure of the image sensing device, signal processing circuit, LED, or the like) of the camera.

Next, the specific structure and operation of the imbalanced amount calculating circuit 116 will be described with reference to FIG. 6.

Figure 6:
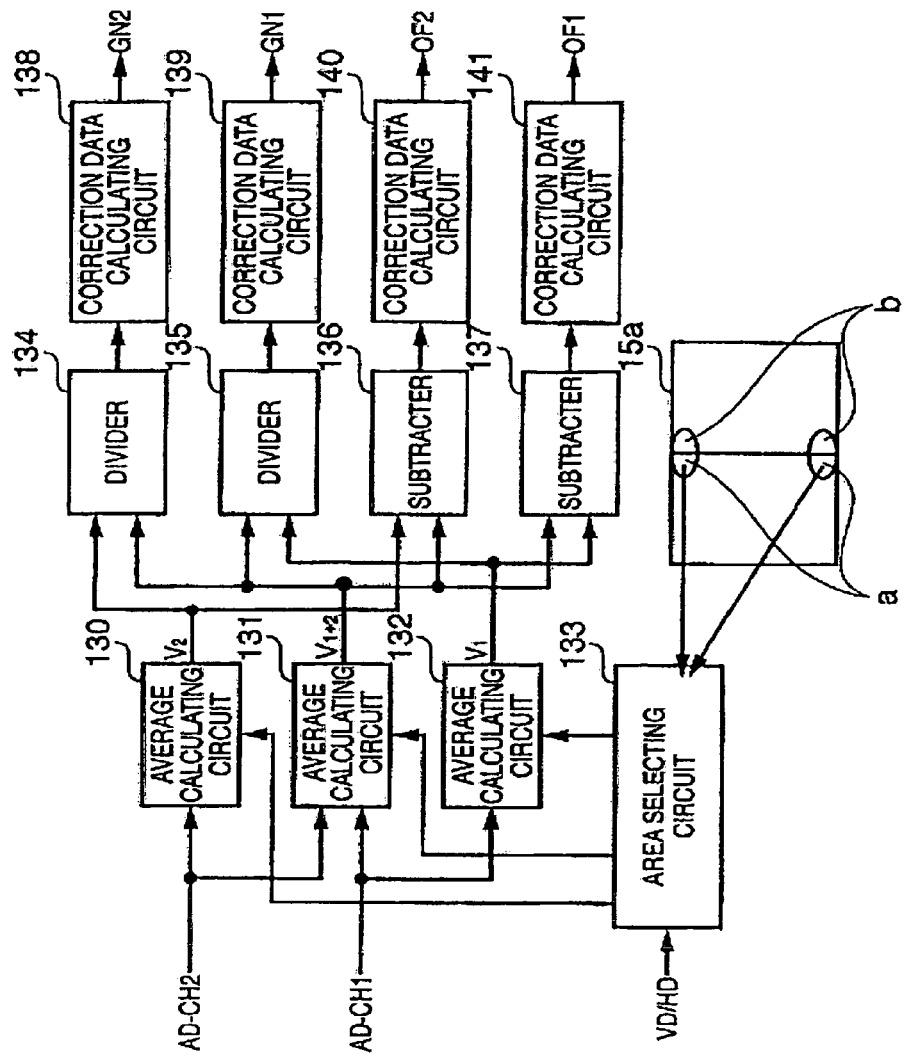
FIG. 6 is a block diagram showing the structure of an imbalanced amount calculating circuit according to the first embodiment of the present invention.

In FIG. 6, first, signals AD-CH1 and AD-CH2 which are the outputs of the A/D conversion circuits 105 and 104 and obtained by turning on the LED devices 17a and 17b are inputted into average calculating circuits 130, 131, and 132. Here, the pixel data is averaged over a predetermined range by these averaging circuits 130 to 132, and an area selecting circuit 133 sets the predetermined range (i.e., predetermined area).

The area selecting circuit 133 determines pixel data, outputted from the image sensing device 15, within an effective range on the basis of the VD/HD signals from the TG/SSG 101 shown in FIG. 5, and sets the timing to permit inputting of pixel data used for averaging in respective average calculating circuits 130 to 132.

For example, the average calculating circuit 130 computes an average of the data of pixels within an illuminated area a by the LED devices 17a and 17b that is shown in the image sensing area 15a of the image sensing device 15. Further, the average calculating circuit 132 computes an average of the data of pixels within an illuminated area b by the LED devices 17a and 17b that is shown in the image sensing area 15a of the image sensing device 15.

The average calculating circuit 131 computes the average of data of pixels within both of the illuminated areas a and b by the LED devices 17a and 17b shown in the image sensing area 15a of an image sensing device 15.

Therefore, in this case, the average calculating circuits 130, 132, and 131 respectively calculate an average of pixel data of a predetermined range which exists in the left half area 15c of the image sensing device 15 shown in FIG. 5, an average of pixel data of a predetermined range which exists in the right half area 15d of the image sensing device 15, and an average of pixel data of a predetermined range which exists both in the right and left half areas of the image sensing device 15, respectively.

Next, let respective outputs of average calculating circuits 130, 131, and 132 be defined as $V_2$, $V_{1+2}$, and $V_1$. Dividers 134 and 135 connected to the average calculating circuits 130, 131, and 132 perform division using the respective outputs.

First, the divider 134 performs the operation of $V_{1+2}/V_2$, and outputs a value substantially proportional to the quotient as a GN2 signal from a correction data calculating circuit 138. Similarly, the divider 135 performs the operation of $V_{1+2}/V_1$, and outputs a value substantially proportional to the quotient as a GN1 signal from a correction data calculating circuit 139.

The GN1 and GN2 signals computed by the above-described method are inputted into the gain adjusting circuits 113 and 112 shown in FIG. 5 respectively, and here, correction is performed so that output levels from both channels may match each other.

Meanwhile, subtracters 136 and 137 also connected to the average calculating circuits 130, 131, and 132 perform subtraction using respective outputs of the average calculating circuits 130, 131, and 132.

First, the subtracter 136 performs the operation of $V_{1+2}-V_2$, and outputs a value substantially proportional to the difference as an OF2 signal from a correction data calculating circuit 140. Similarly, the subtracter 137 performs the operation of $V_{1+2}-V_1$, and outputs a value substantially proportional to the difference as an OF1 signal from a correction calculating circuit 141.

The OF1 and OF2 signals computed by the above-described method are inputted into the offset adjusting circuits 111 and 110 shown in FIG. 5 respectively, and, correction is performed so that output levels from both channels match each other.

The output signals GN1, GN2, OF1, and OF2 relating to the imbalanced amounts computed with the above-described method are stored in the memory (not shown) mounted in the imbalanced amount calculating circuit 116.

According to this first embodiment as described above, relative precision difference between output channels is corrected for an image sensing device having an image sensing area which is divided into a plurality of areas, when image signals are separately outputted from the respective area. Hence it is possible to make the signal difference between areas inconspicuous.

In addition, the method of correcting imbalance by using the above-described two kinds of signals relating to imbalanced amounts (a ratio and difference) is for correcting the imbalance between two output channels of the image sensing device 15 by using respective values of an average of pixel data in a predetermined range which exists in the left half area 15*c*, an average of pixel data in a predetermined range which exists in the right half area 15*d*, and an average of pixel data in a predetermined range which exists in the left half area 15*c* and right half area 15*d*, among pixel data outputted from the image sensing device 15.

Namely, the above-described method performs both of the two kinds of correction, that is, gain adjustment and offset adjustment to the data output via two channels. However, the present invention is not restricted to this, and either one of these adjustment may be selected to perform imbalance adjustment.

[Second Embodiment]

Next, a second embodiment of the present invention will be explained. The structure of an electronic camera in this second embodiment is almost the same as that of the above-described first embodiment. However, it is different from the first embodiment in that cover glass 15*b* which is a protection member for protecting the image sensing area 15*a* of the image sensing device 15 is used as a light guide member. Hereafter, a shutter unit 14 of a camera will be described with reference to the enlarged view shown in FIG. 7.

Figure 7:
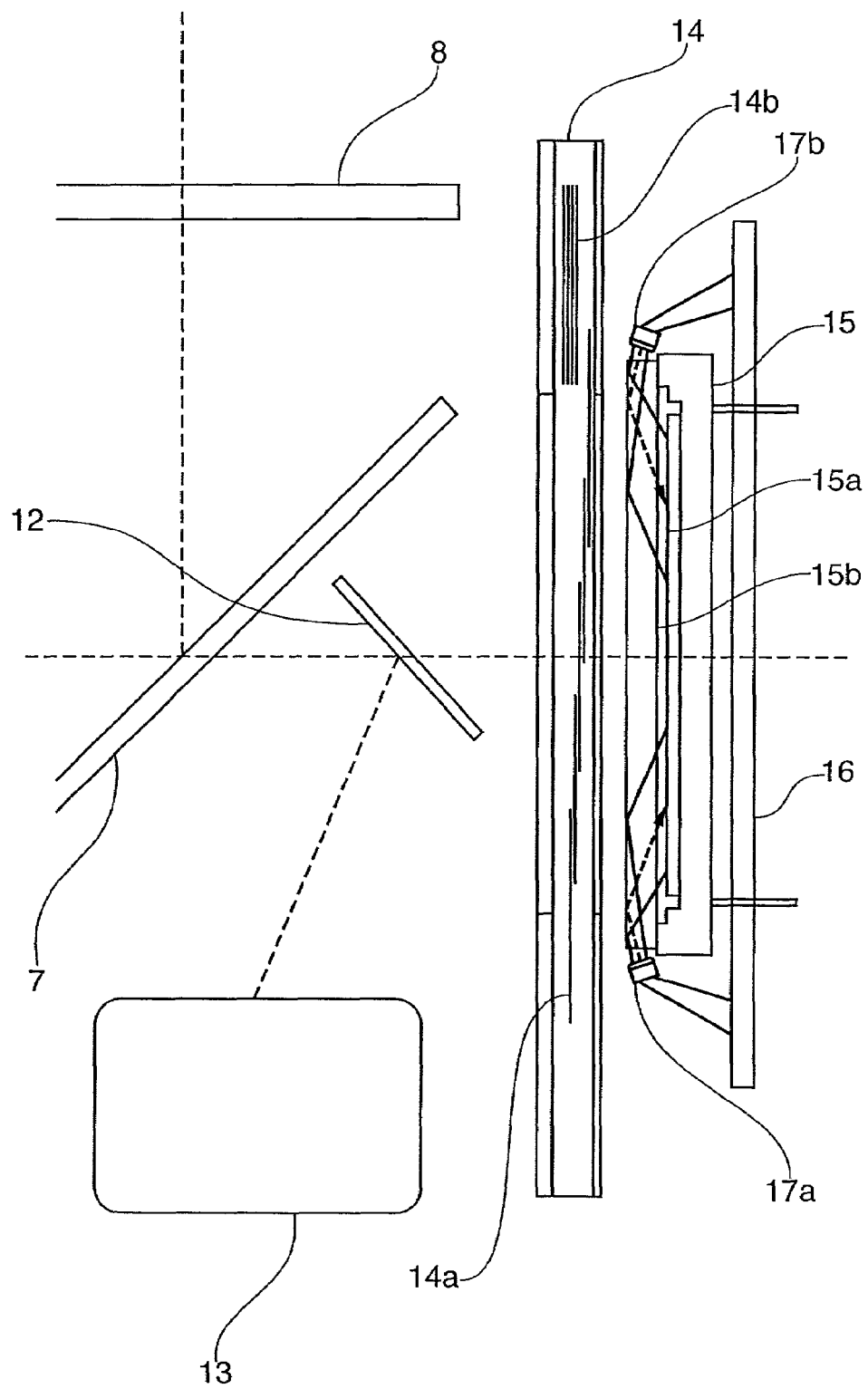
FIG. 7 is a partially enlarged view of an electronic camera according to a second embodiment of the present invention.

As shown in FIG. 7, the LED devices 17*a* and 17*b* are arranged near the upper and lower sides of the image sensing device 15 on the extension line of a parting line which divides the image sensing area 15*a* into a right half area and a left half area. At the same time, the LED devices 17*a* and 17*b* are also arranged on the sides of the image sensing device 15 so that the LED devices 17*a* and 17*b* may emit light with radiation faces of the LED devices 17*a* and 17*b* facing to the end surfaces of the cover glass 15*b*.

Therefore, the luminous flux emitted by the LED devices 17*a* and 17*b* projects on the image sensing area 15*a* of the image sensing device 15 via the backside of the incident surface of the photographic luminous flux of the cover glass 15*b* as a reflection surface. Reflection is repeated between the back face of the incident surface of the photographic luminous flux of the cover glass 15*b* and the backside of an outgoing surface of the photographic luminous flux. The luminous flux is guided to a central part of the image sensing area 15*a*. Therefore, the image sensing area 15*a* is widely illuminated, and hence sufficient illumination effect can be exhibited.

It should be noted that, in this embodiment, the image sensing area 15*a* is illuminated by the direct luminous flux emitted by the LED devices 17*a* and 17*b*. However, a mask member having the predetermined pattern and the optical member for forming this pattern on the image sensing area 15*a* may be arranged near the radiation faces of the LED devices 17*a* and 17*b*, so that light of the predetermined pattern may be incident instead of direct light.

Further, similarly to the first embodiment, the LED devices 17*a* and 17*b* are supported and electrically connected by the electric substrate 16, a supporting member of the image sensing device 15. Nevertheless, the supporting members of the LED devices 17*a* and 17*b* may be formed on the shutter unit 14, a camera body (not shown), etc., and electrical connection may be realized by connecting the LED devices 17*a* and 17*b* to the electric substrate 16 or another circuit board, which is not shown, with a flexible printed circuit board, lead wires, etc.

Since other structures and operations of the electronic camera are the same as those of the first embodiment, their explanation will be omitted.

As described above, when the structure of the second embodiment is used, it is possible to obtain the same effect as that of the first embodiment.

[Third Embodiment]

Next, a third embodiment of the present invention will be explained. The structure of an electronic camera of the third embodiment is almost the same as that of the above-described first embodiment. However, it is different from the first and second embodiments in that a filter member 18, supported with the cover glass 15*b* of the image sensing device 15, is used as a light guide member. Hereafter, a shutter unit 14 of a camera will be described with reference to the enlarged view shown in FIG. 8.

Figure 8:
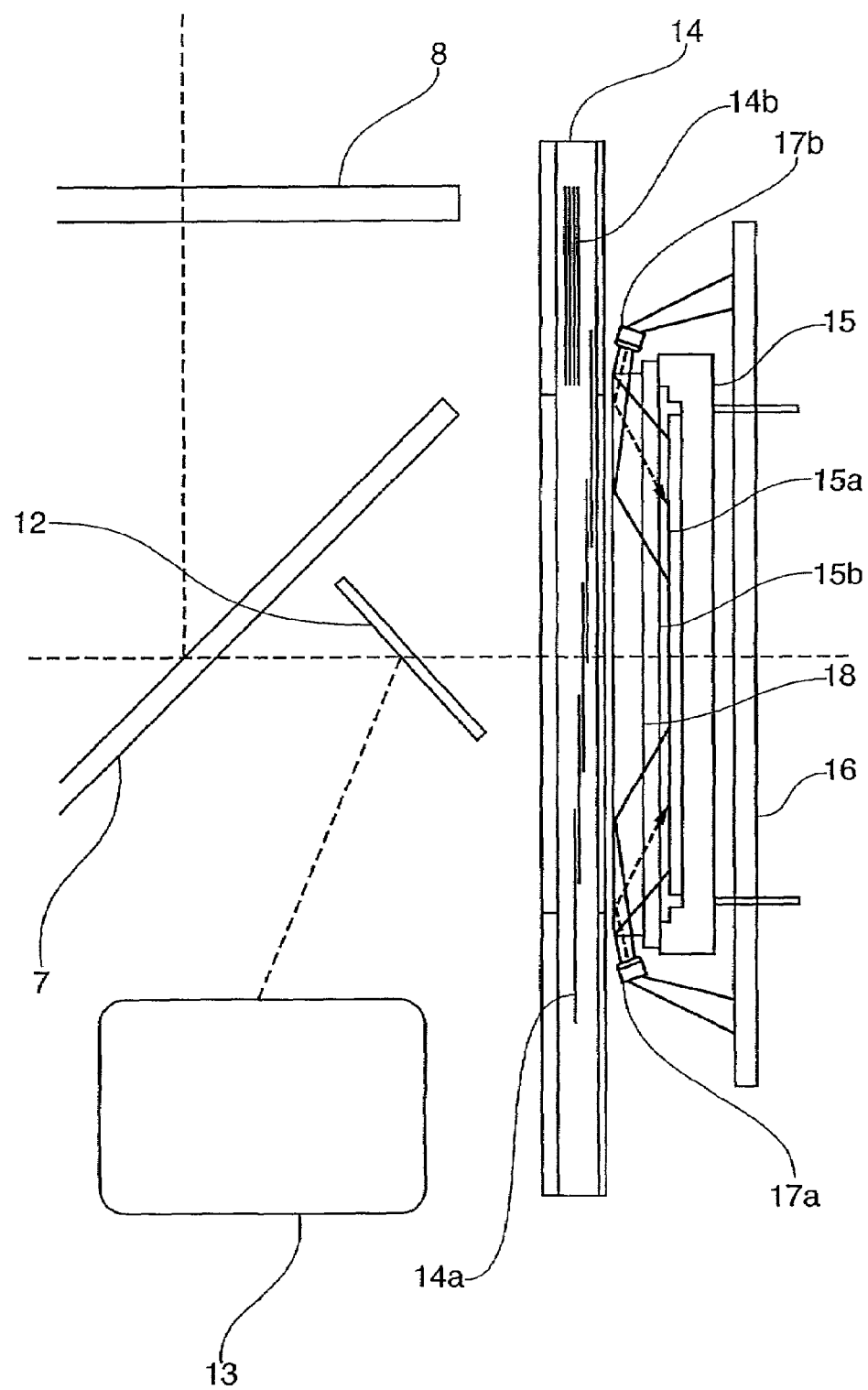
FIG. 8 is a partial enlarged view of an electronic camera according to a third embodiment of the present invention.

As shown in FIG. 8, the LED devices 17*a* and 17*b* are arranged near the upper and lower sides of the image sensing device 15 on the extension line of a parting line which divides the image sensing area 15*a* into the right half area and left half area. At the same time, the LED devices 17*a* and 17*b* are also arranged on the sides of the filter member 18 so that the LED devices 17*a* and 17*b* may emit light with radiation faces of the LED devices 17*a* and 17*b* facing to end surfaces of the filter member 18.

Therefore, the luminous flux emitted by the LED devices 17*a* and 17*b* projects to the image sensing area 15*a* of the image sensing device 15 via the backside of an incident surface of the photographic luminous flux of the filter member 18 as a reflection surface. Reflection is repeated between the back face of the incident plane of the photographic luminous flux of the filter member 18 and the backside of an outgoing surface of the photographic luminous flux. The luminous flux is guided to a central part of the image sensing area 15*a*. Therefore, the image sensing area 15*a* is widely illuminated, and hence sufficient illumination effect can be exhibited.

It should be noted that, in this embodiment, the image sensing area 15*a* is illuminated by the direct luminous flux emitted by the LED devices 17*a* and 17*b*. However, a mask member having the predetermined pattern and the optical member for forming this pattern on the image sensing area 15*a* may be arranged near the radiation faces of the LED devices 17*a* and 17*b*, so that light of the predetermined pattern may be incident instead of direct light.

Further, similarly to the first embodiment, the LED devices 17*a* and 17*b* are supported and electrically connected by the electric substrate 16 that is a supporting member of the image sensing device 15. Nevertheless, the supporting members of the LED devices 17*a* and 17*b* may be formed on the shutter unit 14, a camera body (not shown), etc., and electrical connection may be realized by connecting the LED devices 17*a* and 17*b* to the electric substrate 16 or another circuit board, which is not shown, with a flexible printed circuit board, lead wires, etc.

Since other structures and operations of the electronic camera are the same as those of the first embodiment, explanation of these structures will be omitted.

As described above, when the structure of the third embodiment is used, it is possible to obtain the same effect as that of the first embodiment.

[Fourth Embodiment]

Next, a fourth embodiment of the present invention will be explained. The structure of an electronic camera in the fourth embodiment is almost the same as that of the above-described first embodiment. However, it is different from the first to third embodiments in that the image sensing area 15a of the image sensing device 15 is illuminated from the other side of the cover glass 15b that is a protection member for protecting the image sensing area 15a. Hereafter, a shutter unit 14 of a camera will be described with reference to the enlarged view shown in FIG. 9.

Figure 9:
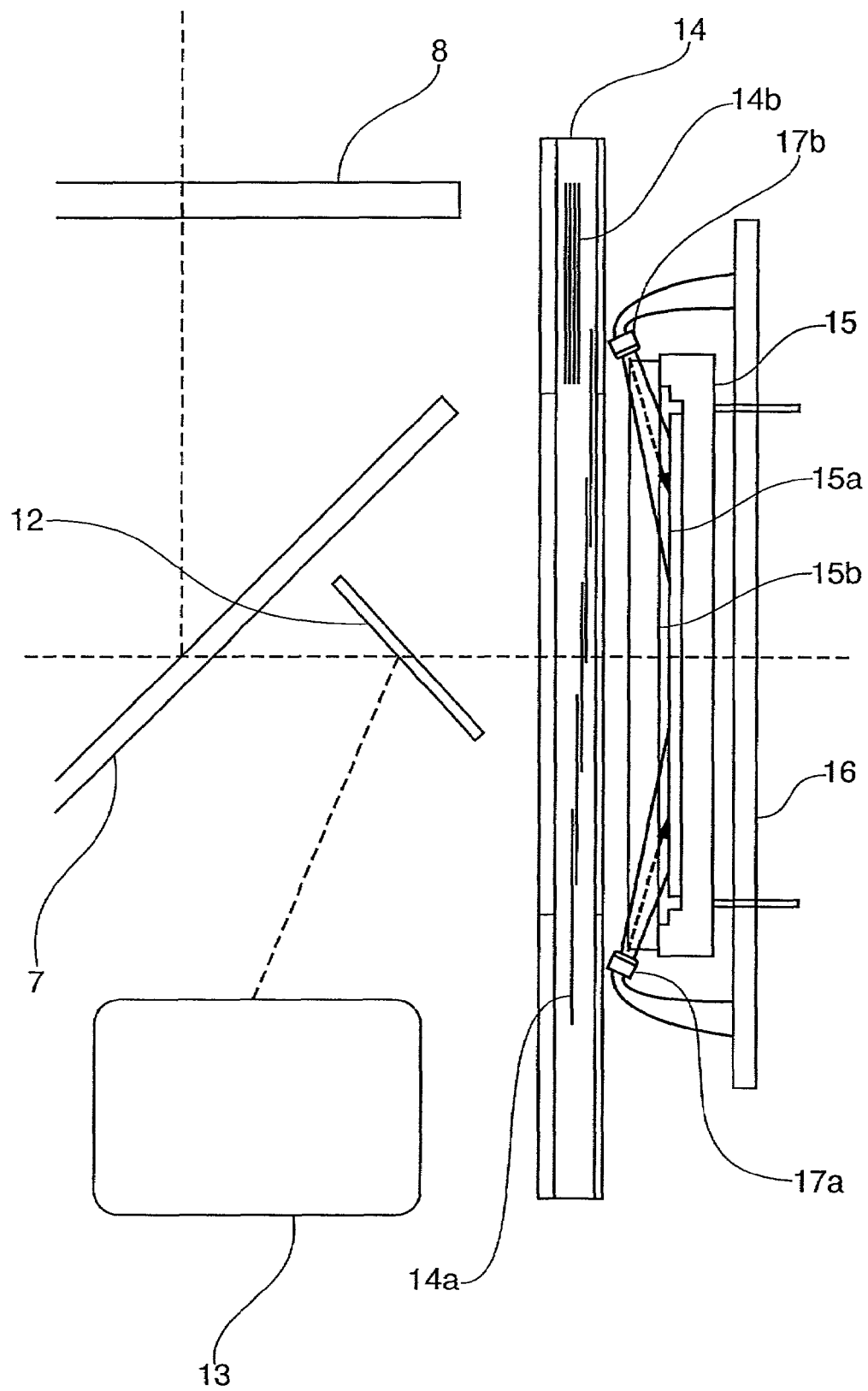
FIG. 9 is a partially enlarged view of an electronic camera according to a fourth embodiment of the present invention.

As shown in FIG. 9, the LED devices 17a and 17b are arranged near the upper and lower sides of the image sensing device 15 on the extension line of a parting line which divides the image sensing area 15a into the right half area and left half area. At the same time, the LED devices 17a and 17b are also arranged on the other side of the cover glass 15b with respect to the image sensing device 15 so that the LED devices 17a and 17b may emit light with radiation faces of the LED devices 17a and 17b facing to an incident face of the photographic luminous flux of the cover glass 15b.

Therefore, the luminous flux emitted by the LED devices 17a and 17b is incident on an incident face of the photographic luminous flux of the cover glass 15b, and illuminates the image sensing area 15a of the image sensing device 15. As described above, it is possible to obtain illumination brightness greater than that of the case of performing illumination by reflection light. Hence, it becomes possible to further miniaturize the LED devices 17a and 17b, a degree of freedom of layout of the LED devices 17a and 17b increases, and improvement in space efficiency can be obtained.

It should be noted that, in this embodiment, the image sensing area 15a is illuminated by the direct luminous flux emitted by the LED devices 17a and 17b. However, a mask member having the predetermined pattern and the optical member for forming this pattern on the image sensing area 15a may be arranged near the radiation faces of the LED devices 17a and 17b, so that light of the predetermined pattern may be incident instead of direct light.

Further, similarly to the first embodiment, the LED devices 17a and 17b are supported and electrically connected by the electric substrate 16 that is a supporting member of the image sensing device 15. Nevertheless, the supporting members of the LED devices 17a and 17b may be formed on the shutter unit 14, a camera body (not shown), etc., and electrical connection may be realized by connecting the LED devices 17a and 17b to the electric substrate 16 or another circuit board, which is not shown, with a flexible printed circuit board, lead wires, etc.

Since other structures and operations of the electronic camera are the same as those of the first embodiment, explanation of them will be omitted.

As described above, when the structure of the fourth embodiment is used, it is possible to obtain the same effect as that of the first embodiment.

[Fifth Embodiment]

Next, a fifth embodiment of the present invention will be explained. The structure of an electronic camera in the fifth embodiment is almost the same as that of the above-described first embodiment. However, the structure of an imbalanced amount calculating circuit 116 according to the fifth embodiment is different from that described in the first embodiment with reference to FIG. 6. Hereafter, the structure and operation of the imbalanced amount calculation circuit 116 in the fifth embodiment will be described with reference to FIG. 10.

Figure 10:
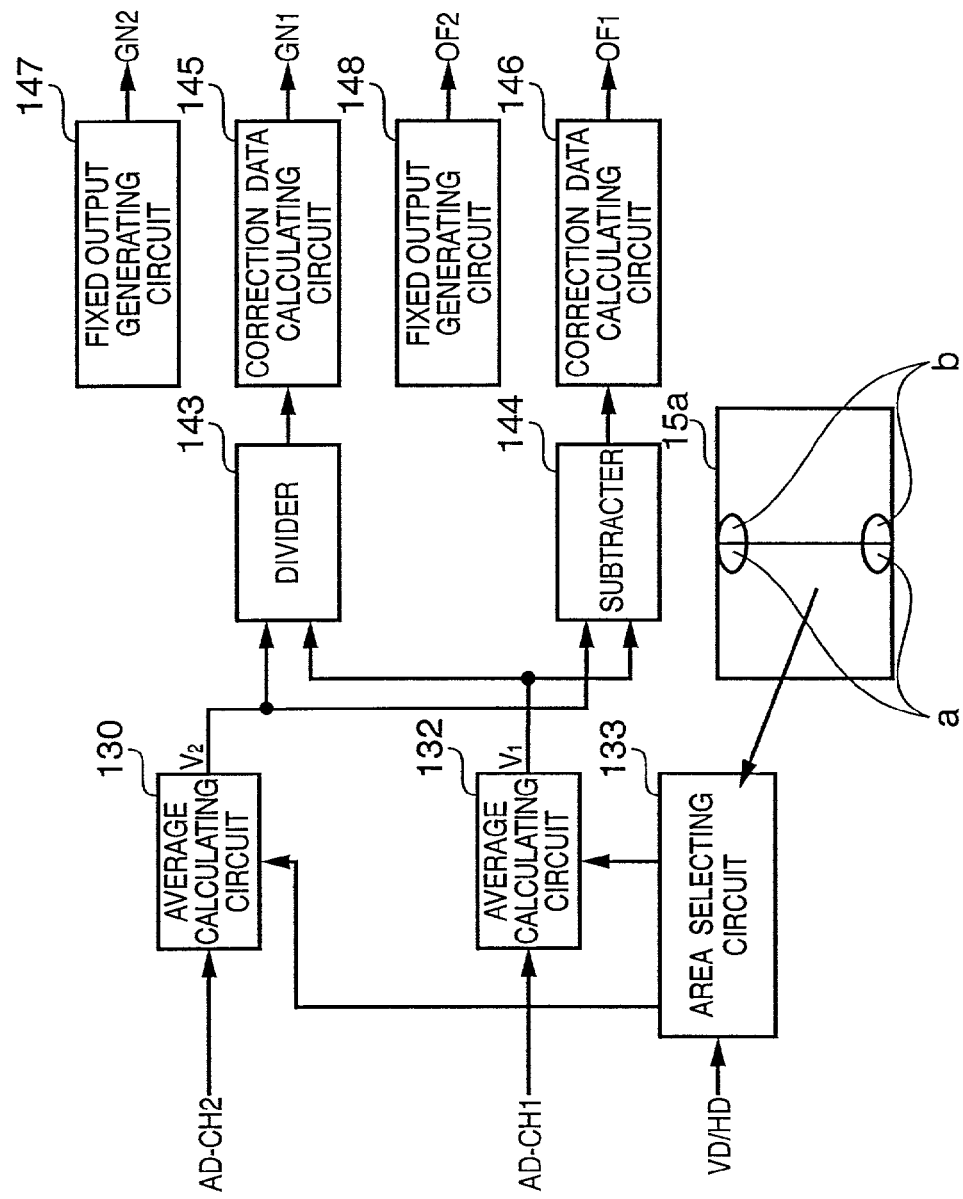
FIG. 10 is a block diagram showing the structure of an imbalanced amount calculating circuit according to a fifth embodiment of the present invention.

In FIG. 10, first, signals AD-CH1 and AD-CH2 which are the outputs of the A/D conversion circuit 105 and 104 are inputted into the average calculating circuits 130 and 132 that are the same as those shown in FIG. 6. As shown in FIG. 10, there is no average calculating circuit 131 shown in FIG. 6. Here, the pixel data is averaged over a predetermined range by the average calculating circuits 130 and 132, and the area selecting circuit 133 sets the predetermined range (i.e., predetermined area).

The area selecting circuit 133 determines pixel data, outputted from the image sensing device 15, within an effective range on the basis of the VD/HD signals from the TG/SSG 101 shown in FIG. 5, and sets the timing to permit inputting of pixel data used for averaging in respective average calculating circuits 130 and 132.

For example, the average calculating circuit 130 computes an average of the data of pixels within an illuminated area a by the LED devices 17a and 17b that is shown in the image sensing area 15a of the image sensing device 15. Further, the average calculating circuit 132 computes an average of the data of pixels within an illuminated area b by the LED devices 17a and 17b that is shown in the image sensing area 15a of the image sensing device 15.

Therefore, in this case, the average calculating circuits 130 and 132 respectively calculate an average of pixel data of a predetermined range which exists in the left half area 15c of the image sensing device 15 shown in FIG. 5, and an average of pixel data of a predetermined range which exists in the right half area 15d of the image sensing device 15, respectively.

Next, let respective outputs of average calculating circuits 130 and 132 be defined as $V_2$, and $V_1$. A divider 143 connected to the average calculating circuits 130 and 132 performs division using respective outputs. The divider 143 performs the operation of $V_2/V_1$, and outputs a value substantially proportional to the quotient as a GN1 signal from a correction data calculating circuit 145. Whereas, from a fixed output generating circuit 147, a GN2 signal is outputted as a fixed output.

The GN1 signal, which is computed by the above-described method, and the GN2 signal, which is a fixed value, are inputted into the gain adjusting circuits 113 and 112 shown in FIG. 5 respectively, and here, correction is performed so that output levels from both channels match each other.

Meanwhile, a subtracter 144 connected to the average calculating circuits 130 and 132 performs subtraction using respective outputs of the average calculating circuits 130 and 132.

First, the subtracter 144 performs the operation of $V_2-V_1$, and outputs a value substantially proportional to the difference as an OF1 signal from a correction data calculating circuit 146. Whereas, from the fixed output generating circuit 148, an OF2 signal is outputted as a fixed output.

The OF1 signal, which is computed with the above-described method, and the OF2 signal, which is a fixed value, are inputted into the offset adjusting circuits 111 and 110 shown in FIG. 5 respectively, and here, correction is performed so that output levels from both channels match each other.

The output signals GN1, GN2, OF1, and OF2 relating to the imbalanced amounts computed with the above-described method are stored in the memory (not shown) mounted in the imbalanced amount calculating circuit 116.

In addition, the method of correcting imbalance by using the above-described two kinds of signals relating to imbalanced amounts (a ratio and difference) is for correcting the imbalance between two output channels of the image sensing device 15 by using relationship between an average of pixel data in a predetermined range which exists in the left half area 15c and an average of pixel data in a predetermined range which exists in the right half area 15d among pixel data outputted from the image sensing device 15. Therefore, similarly to the first embodiment, either one of these adjustment may be also selected to perform imbalance adjustment.

In addition, in the fifth embodiment, the values of GN2 and OF2 are fixed, and the divider 143 and subtracter 144 perform operations using the value of AD-CH2 as a reference value. However, it is also possible to have such structure that the values of GN1 and OF1 are fixed and operations are performed by using the value of AD-CH1 as a reference value.

Since other structures and operations of the electronic camera are the same as those of the first embodiment, their explanation will be omitted.

As described above, when the structure of the fifth embodiment is used, it is possible to obtain the same effect as that of the first embodiment.

[Sixth Embodiment]

Next, a sixth embodiment of the present invention will be explained. The structure of an electronic camera in this sixth embodiment is almost the same as that of the above-described first embodiment. The structure of an imbalanced amount calculating circuit 116 according to the sixth embodiment is different from that described in the first and fifth embodiments with reference to FIGS. 6 and 10. Hereafter, the structure and operation of the imbalanced amount calculation circuit 116 in the sixth embodiment will be described with reference to FIG. 11.

Referring to FIG. 11, the imbalanced amount calculation circuit 116 has the structure in that AD-CH1 and signals AD-CH2 outputted from the A/D conversion circuits 105 and 104 are transmitted to memory 155 and 154 respectively through memory controllers 153 and 152.

Here, a range of data from the image sensing device to be stored in the memory 155 and 154 through the memory controllers 153 and 152 is determined in accordance with the predetermined timing generated by the timing generating circuit 150. In this case, the data to be stored is from the vertical block column shown by a and b in FIG. 12A. In the data within the blocks shown by these blocks a and b, color data (in this case, G/R/B/G) determined by an arrangement of a color filter array of the image sensing device 15 is included.

Therefore, the data from the memory 155 and 154 is read block by block through the memory controllers 153 and 152. Simple luminance signals are generated by adding color signals for each block according to equation (1) in the luminance signal generating circuits 157 and 156.

$$Y = R + 2G + B \qquad (1)$$

Figure 12A:
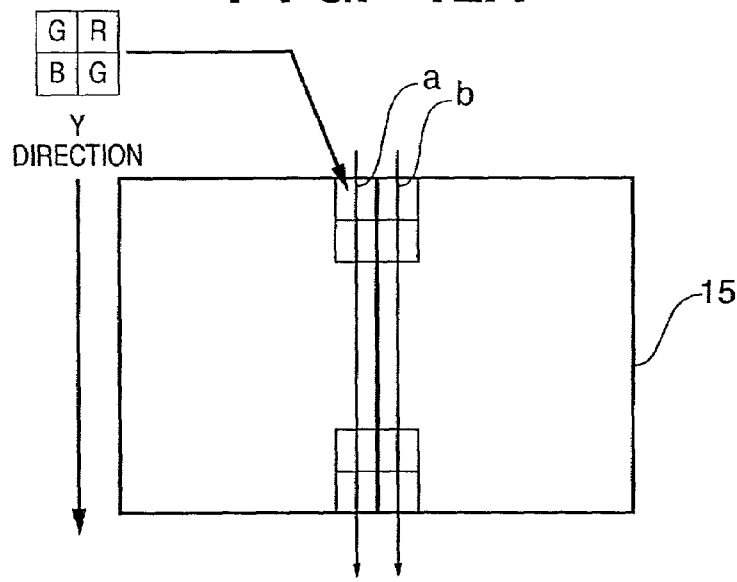
FIGS. 12A to 12C are drawings explaining the concept of output correction of an image sensing device according to the sixth embodiment of the present invention.

The luminance signals generated in the luminance signal generating circuits 157 and 156 are read one by one in the Y direction in FIG. 12A. Solid lines in graphs A and B in FIGS. 12B and 12C respectively show the result obtained by low pass filters 159 and 158 by performing one-dimensional low pass filtering on the read luminance signals and the like with respect to the read-out direction (Y direction) are shown by respectively.

Next, the outputs of the low pass filters 159 and 158 are inputted into the offset adders 163 and 162 respectively, and the other inputs of the offset adders 163 and 162 are connected with an output of an offset setting circuit 160.

In an initial state, the output of the offset setting circuit 160 is 0, and outputs of the offset adders 163 and 162 are inputted into a correlation operating circuit 164, which performs correlating operation.

A conceivable method of correlating operation here is, for example, as follows. Let each luminance data of the block a located in a left-hand side of the central boundary on the screen of the image sensing device 15 shown in FIG. 12A be Ia(i), and each luminance data of the block b located in a right-hand side be Ib(i), then, $$P = \Sigma |Ia(i) - Ib(i)| \qquad (2)$$

The result of this correlating operation is determined in a total determination circuit 151. If it is determined that correlation is still insufficient, amounts of predetermined offsets are computed in the offset setting circuit 160, and are supplied to the offset adders 162 and 163 respectively.

Figure 12B:
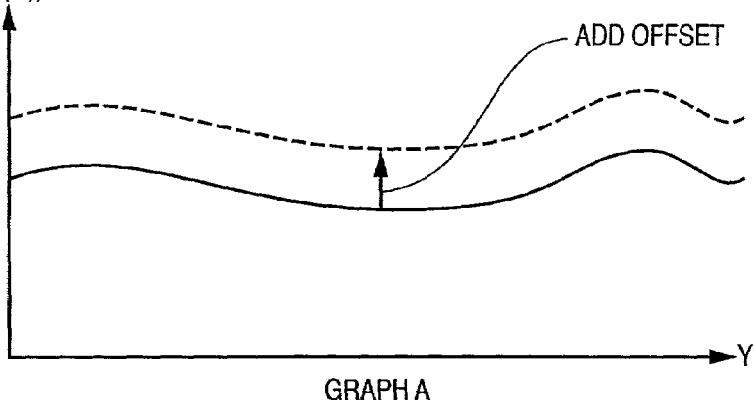
Figure 12C:
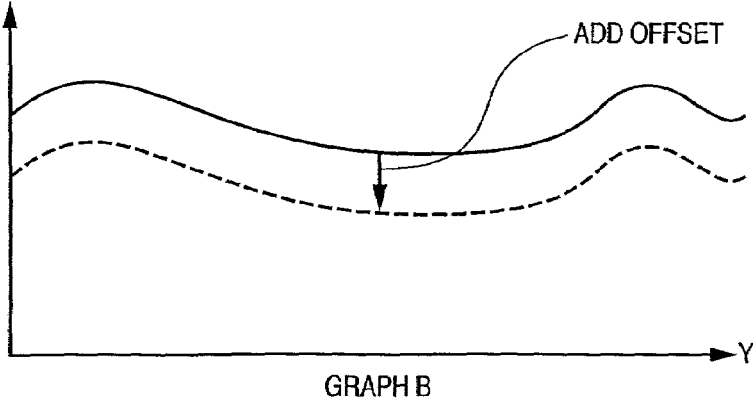

For example, the plus (+) offset amount is added to Ia(i) and the minus (−) offset amount is added to Ib(i) as shown in a graph A in FIG. 12B, and a graph B in FIG. 12C. Correlation operation of the result after this offset addition is performed again in the correlation operating circuit 164, and the result is determined in the total determination circuit 151.

It is determined that the results of both outputs considerably match if it is determined that the result of the correlating operation is sufficient. Hence the outputs OF1 and OF2 of the offset setting circuit 160 that are set at this time are respectively inputted into the offset adjusting circuits 111 and 110 shown in FIG. 5 to correct the imbalance between the two channels of the image sensing device 15.

On the other hand, although the outputs of the low pass filters 159 and 158 are also inputted into the gain multipliers 166 and 165 respectively, and the other inputs of the gain multipliers 166 and 165 are connected with the output of the gain setting circuit 161.

In an initial state, the output of the gain setting circuit 161 is 1, and outputs of the gain multipliers 163 and 162 are inputted into a correlation operating circuit 167, which performs correlating operation.

A conceivable method of correlating operation here is, for example, as follows. Let each luminance data of the block a located in the left-hand side of the central boundary portion on the screen of the image sensing device 15 shown in FIG. 12A is Ia(i) and each luminance data of the block b located in the right-hand side is Ib(i), then, $$P = \Sigma |Ia(i) \times Ib(i)| \qquad (3)$$

The result of this correlating operation is determined in the total determination circuit 151. If it is determined that correlation is still insufficient, amounts of predetermined gains are computed in the gain setting circuit 161, and are supplied to the gain multipliers 162 and 163 respectively.

It is determined that the results of both outputs considerably match if it is determined that the result of the correlating operation is sufficient. Hence the outputs GN1 and GN2 of the gain setting circuit 161 that are set at this time are respectively inputted into the gain adjusting circuits 113 and 112 shown in FIG. 5 to correct the imbalance between the two channels of the image sensing device 15.

The output signals GN1, GN2, OF1, and OF2 relating to the imbalanced amounts computed with the above-described method are stored in the memory (not shown) mounted in the imbalanced amount calculating circuit 116.

In addition, the method of correcting imbalance by using the above-described two kinds of signals relating to imbalanced amounts (a ratio and difference) is for correcting the imbalance between two output channels of the image sensing device 15 by determining correlation between values of an average of pixel data in a predetermined range which exists in the left half area 15*c* and an average of pixel data in a predetermined range which exists in the right half area 15*d* among pixel data outputted from the image sensing device 15, then setting offset amounts and gain amounts. Therefore, similar to the first embodiment, either one of these adjustment may be selected to perform imbalance adjustment.

In addition, low pass filtering is performed to the outputs of the luminance signal generating circuits 156 and 157 in the sixth embodiment. However, it is possible to adopt a method of performing correlating operation to the result of band pass filter processing in addition to this method, or a method of adjusting an amount of imbalanced between left and right areas with applying a little more advanced conditional judgment (for example, a selection of a partial area).

Since other structures and operations of the electronic camera are the same as those of the first embodiment, explanation of them will be omitted.

As described above, when the structure of the sixth embodiment is used, it is possible to obtain the same effect as that of the first embodiment.

[Seventh Embodiment]

Next, a seventh embodiment of the present invention will be explained.

In the seventh embodiment, a method of area division of an image sensing device differs from that of the first to sixth embodiments.

Figure 13A:
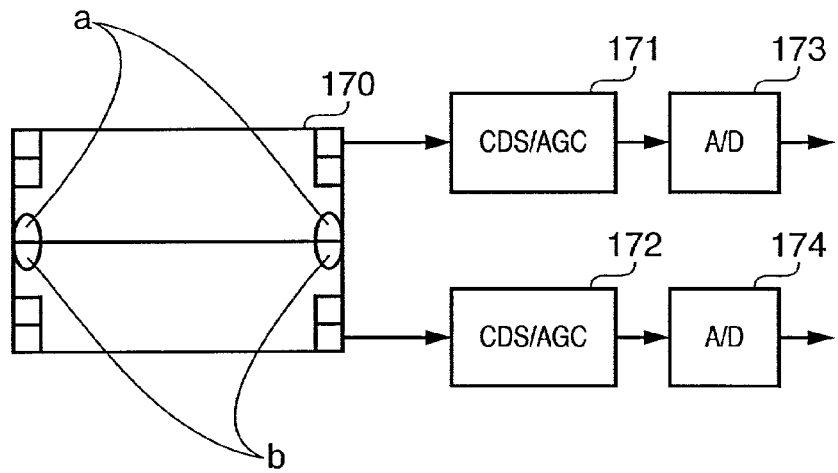
FIGS. 13A and 13B are block diagrams showing other structural examples of an image sensing device according to a seventh embodiment of the present invention.
Figure 13B:
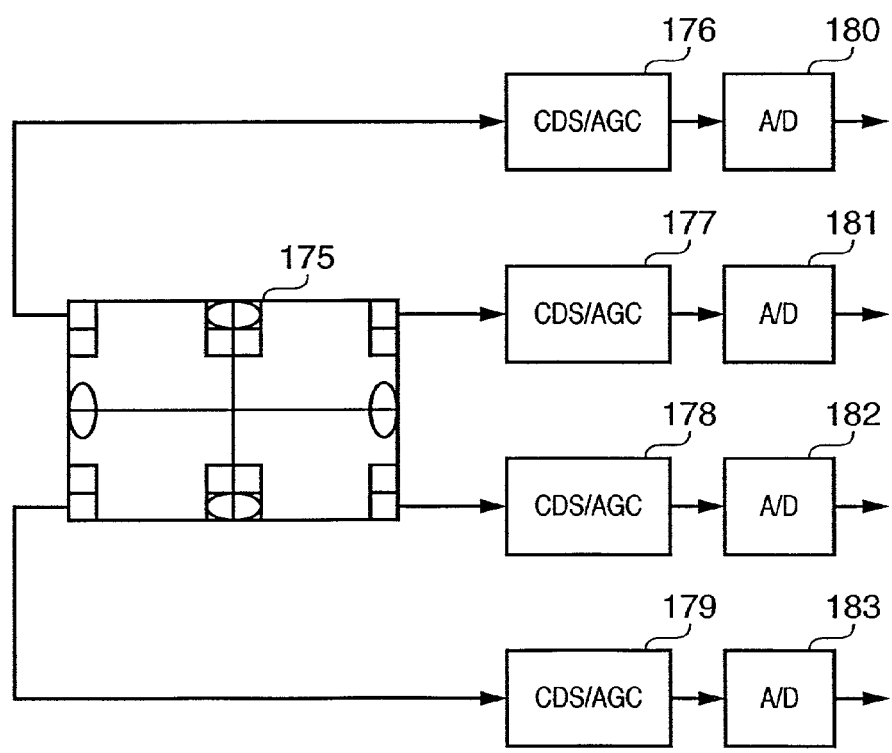

FIGS. 13A and 13B are block diagrams showing examples of area division. FIG. 13A shows the structure capable of separately reading upper and lower half areas in an image sensing device. Thus, an output of the upper half area read from the image sensing device 170 is converted into digital data by an A/D conversion circuit 173 through a CDS/AGC circuit 171, and thereafter inputted into, e.g., the memory controller 106 shown in FIG. 5.

Similarly, an output of the lower half area read from the image sensing device 170 is converted into digital data by an A/D conversion circuit 174 through a CDS/AGC circuit 172, and thereafter inputted into, e.g., the memory controller 108 shown in FIG. 5.

In the image sensing device 170 shown in FIG. 13A, LED devices used for calibration are arranged near the right and left end portions of the border between upper and lower half areas, thereby right and left end portions are illuminated.

FIG. 13B shows the structure capable of separately reading four quadrant areas obtained by dividing an image sensing area vertically and horizontally into 4 pieces in an image sensing device. An output of the upper left quadrant area read from an image sensing device 175 is converted into digital data by an A/D conversion circuit 180 through a CDS/AGC circuit 176, and thereafter inputted into, e.g., a memory controller having the same function as the memory controllers 106 and 108 in FIG. 5.

An output of the upper right quadrant area read from the image sensing device 175 is converted into digital data by an A/D conversion circuit 181 through a CDS/AGC circuit 177, and thereafter inputted into a memory controller.

An output of the lower right quadrant area read from the image sensing device 175 is converted into digital data by an A/D conversion circuit 182 through a CDS/AGC circuit 178, and thereafter inputted into a memory controller having the same function as the memory controllers 106 and 108 in FIG. 5.

Similarly, an output of the lower left quadrant area read from the image sensing device 175 is converted into digital data by an A/D conversion circuit 183 through a CDS/AGC circuit 179, and thereafter inputted into a memory controller.

At this time, the image sensing device 175 shown in FIG. 13B is constituted so that each of boundary portion made by vertically and horizontally dividing a plane into four pieces may be illuminated by arranging LED devices for calibration near the edges of the boundary areas. In addition, respective four boundary areas made by vertically and horizontally dividing a plane into four areas are illuminated in FIG. 13B. However, it is also possible to have such structure that a boundary portion of four quadrants that is located in the central portion of the image sensing device 175 may be illuminated by using the LED devices for calibration, that are arranged in upper and lower sides as shown in FIGS. 7 and 8, via the cover glass 15*b* or the filter member 18.

Since other structures and operations of the electronic camera are the same as those of the first embodiment, explanation of them will be omitted.

As described above, when the structure of the seventh embodiment is used, it is possible to obtain the same effect as that of the first embodiment.

In addition, dividing patterns of an image sensing device are not restricted in the above-described patterns. It is possible to easily apply the present invention by adding a processing circuit corresponding to each output channel even when the image sensing device is divided into three areas, or five or more areas.

[Eighth Embodiment]

Next, an eighth embodiment of the present invention will be described.

Each imbalanced amounts is computed in the above-described first to seventh embodiments when a calibration mode is selected by the mode setting unit 118 shown in FIG. 5. In the eighth embodiment, a case of computing imbalanced amounts at a time other than above will be described. It should be noted that any electronic camera having any one of structures described in the first to seventh embodiments may be used as an image sensing apparatus in the eighth embodiment.

Figure 14:
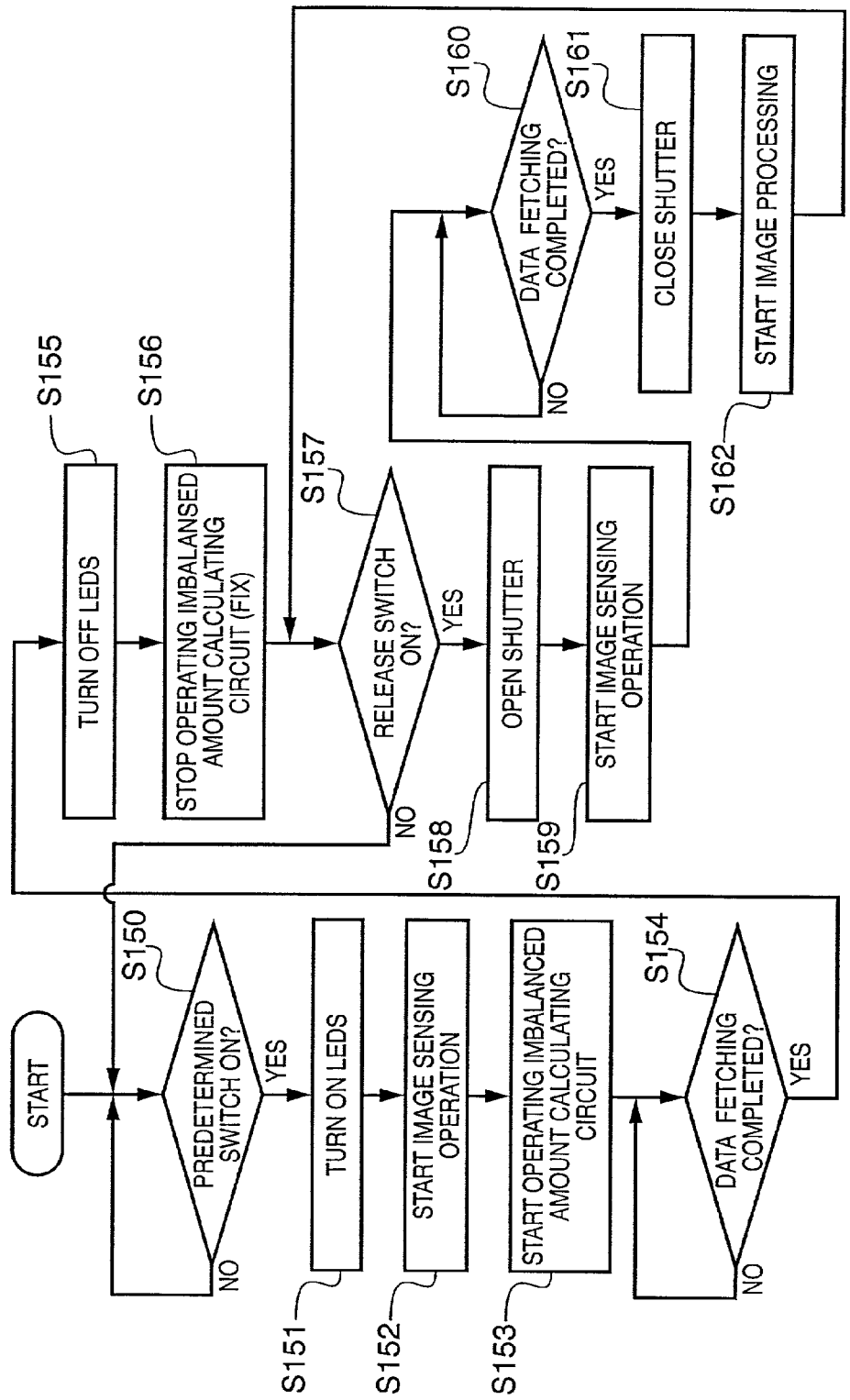
FIG. 14 is a flow chart for describing the operation according to an eighth embodiment of the present invention.

Next, the procedure of detecting imbalance between two channels of an image sensing device 15 by using the LEDs 17*a* and 17*b* incorporated in an electronic still camera 1 having the above-described structure in the eighth embodiment and using the imbalance for main image sensing operation will be described with reference to a flow chart in FIG. 14.

First, at step S150, it is determined whether a predetermined switch among operation switches of the camera 1 is in an ON state. If it is OFF, the state detection of this predetermined switch is continued, and if it is detected that this predetermined switch is turned on, the process goes to the next step S151. Note, any desired switch may be configured to be the predetermined switch for the ON/OFF states detection. For example, if the shutter release switch 25 is a two-step switch, the switch 25 may be determined to be in an ON state when it is in a half-stroke state.

At step S151, the image sensing device 15 is illuminated by predetermined illumination by lighting the LEDs 17*a* and 17*b* with keeping the shutter unit 14 closed. Next, a predetermined trigger signal is given to the TG/SSG 101 at step S152, thereby image sensing operation by the image sensing device 15 is started.

Then, at step S153, the operation of an imbalanced amount calculating circuit 116 is started, and an imbalanced amount between two signal outputs AD-CH1 and AD-CH2 from the image sensing device 15 is computed. In this case, since the shutter unit 14 is kept closed, naturally, light incident on the image sensing device 15 is only the light from the LEDs 17a and 17b. Hence, light amounts incident on near the boundary between a left half area and a right half area become almost equal to each other, and the difference between outputs of the two channels expresses the imbalanced amount between the channels.

When it is detected that the fetching of image data is completed at step S154, the LEDs 17a and 17b are turned off at step S155.

At this time, in the imbalanced amount calculating circuit 116, the imbalanced amount between two channels has been detected using any one of the methods described in the first, fifth, and sixth embodiments. In addition, the offset data OF1 and OF2 and/or the gain data GN1 and GN2 for equalizing the output levels of the two channels have been completed. Then, the operation of the imbalanced amount calculating circuit 116 is stopped at step S156, and the result is saved (fixed).

Next, at step S157, it is determined whether the release switch 25 for instructing to start main image sensing operation is operated by the user. If it is determined that the release switch 25 is not operated, the process returns to the step S150 again to repeat the operation to the step S157.

It should be noted that, in the case where the predetermined switch of step S150 is a self timer switch and the like of the camera 1, it is also possible to perform step S158 just after step S156 without performing the determination of the release switch 25 at step S157.

Whereas, if it is determined that the operation of the release switch 25 is performed at the step S157, the process goes to step S158. The CPU 117 controls to open the shutter unit 14 through the control circuit 121. At step S159, the usual image sensing operation by the image sensing device 15 is simultaneously started by giving a predetermined trigger signal to the TG/SSG 101.

When it is detected that the fetching of image data is completed at step S160, the CPU 117 controls to close the shutter unit 14 at step S161.

In this case, the image data is temporarily stored in the memory 107 and 109 through the memory controllers 106 and 108. The reading of this image data from the memory 107 and 109 is started so as to start image processing at the following step S162.

At this time, the correction data (OF2, OF1, GN2, and GN1) computed from the imbalanced amounts in the state where the image sensing device 15 is illuminated by the LEDs 17a and 17b as described above are set in offset adjusting circuits 110 and 111 and gain adjusting circuits 112 and 113. Finally, correction to the read image data obtained in the usual image sensing operation is performed using the correction data.

According to the eighth embodiment as described above, when a camera or the like has an image sensing device with a plurality of output channels, the imbalance between output levels of the plurality of output channels can be automatically suppressed in the image sensing sequence of the camera.

[Ninth Embodiment]

Next, a ninth embodiment of the present invention will be described with reference to FIGS. 15 and 16.

Figure 15:
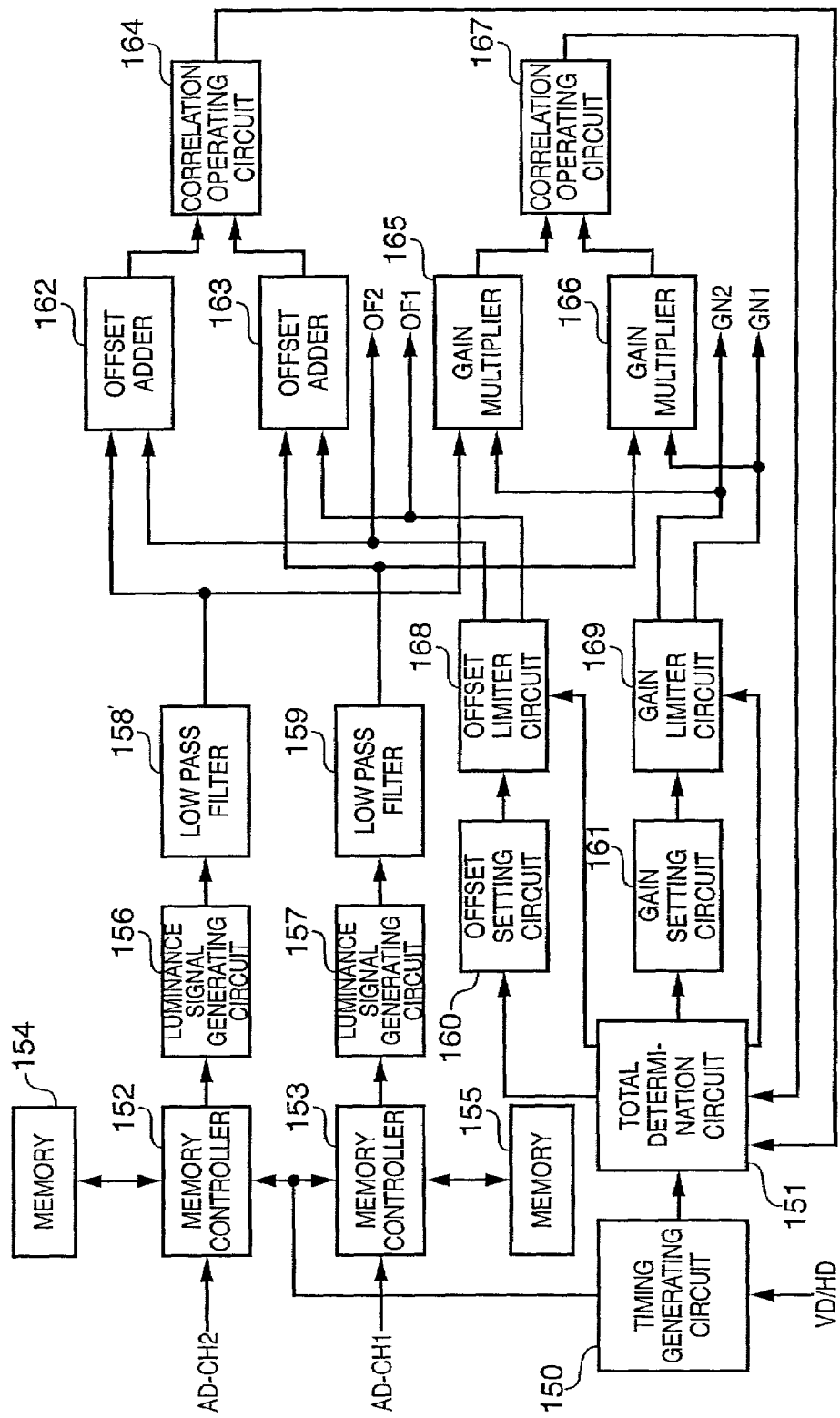
FIG. 15 is a block diagram showing the structure of an imbalanced amount calculating circuit according to a ninth embodiment of the present invention.
Figure 16:
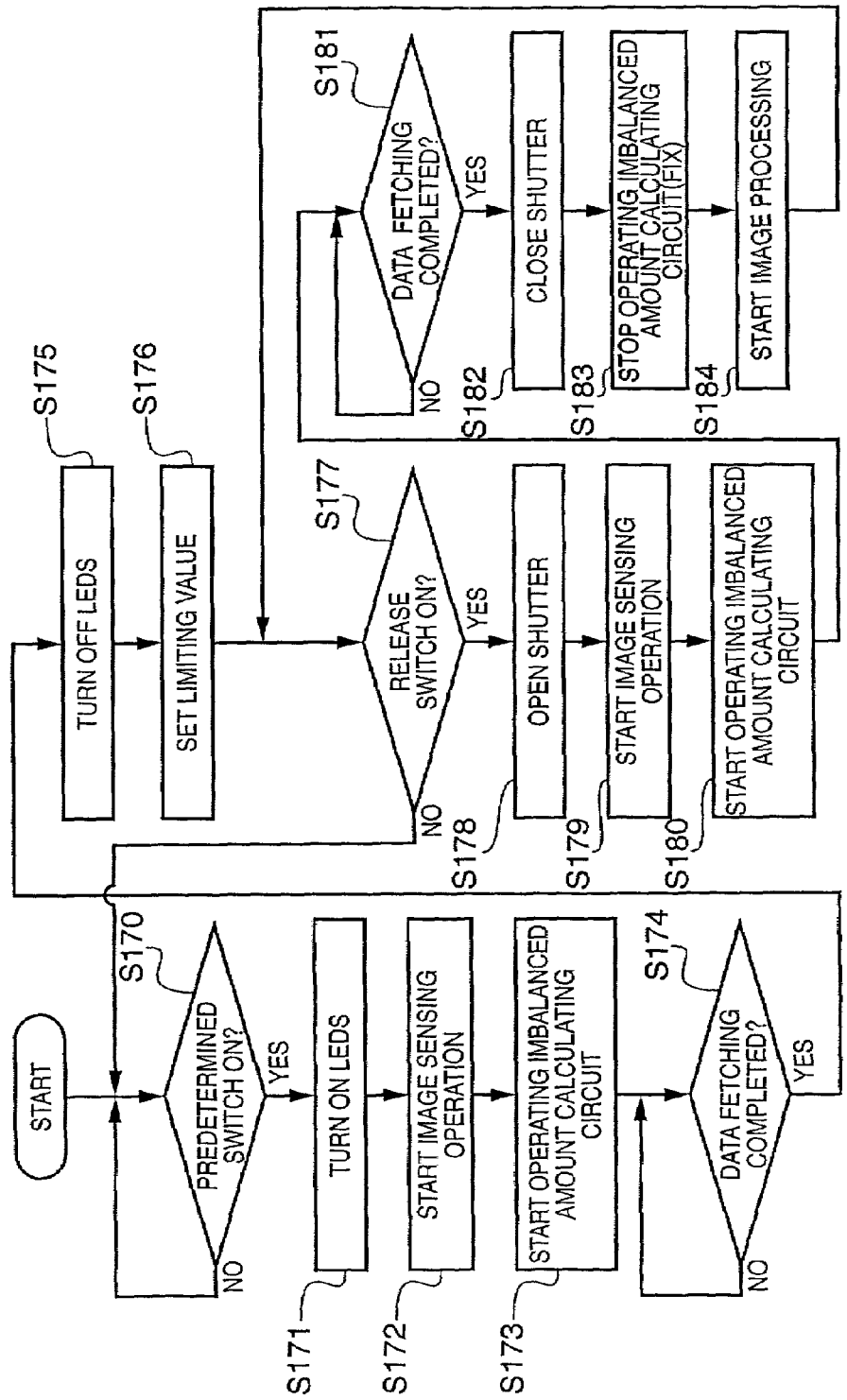
FIG. 16 is a flow chart for describing the operation according to the ninth embodiment of the present invention.

FIG. 15 is a block diagram showing another structure of the imbalanced amount calculation circuit 116 shown in FIG. 5. Since the other structure of the electronic still cameras 1 is the same as that shown in FIG. 5, explanation is omitted here.

The structure shown in FIG. 15, compared to the structure shown in FIG. 11 described in the sixth embodiment, further includes an offset limiter circuit 168 for setting a limit to an output of the offset setting circuit 160, and a gain limiter circuit 169 for setting a limit to an output of the gain setting circuit 161. The limiting values of the limiter circuits 168 and 169 can be changed suitably on the basis of the determination result in the total determination circuit 151. Since other components are the same as those shown in FIG. 11, detailed explanation is omitted here.

Next, procedure in the ninth embodiment will be described with reference to a flow chart in FIG. 16. The procedure includes roughly detecting the imbalance between two channels of the image sensing device 15 using the LEDs 17a and 17b incorporated in the electronic still camera 1 which has the above-described structure, and setting the limiting values in the imbalanced amount calculating circuit 116 using the values.

First, at step S170, it is determined whether a predetermined switch among the operation switches of the camera is in an ON state. When the switch is OFF, the state detection of this predetermined switch is continued, and if it is detected that this predetermined switch is turned ON, the process goes to the following step S171. Note, similarly to the 8th embodiment, any desired switch can be configured to be the predetermined switch for the ON/OFF state detection. For example, if the shutter release switch 25 is a two-step switch, the switch 25 may be determined to be in an ON state when it is in a half-stroke state.

At step S171, the image sensing device 15 is illuminated by predetermined illumination by lighting the LEDs 17a and 17b by keeping the shutter unit 14 closed. Next, a predetermined trigger signal is given to the TG/SSG 101 at step S172, thereby image sensing operation by the image sensing device 15 is started.

At step S173, the operation of the imbalanced amount calculating circuit 116 is started to compute the imbalanced amount between two signal outputs AD-CH1 and AD-CH2 from the image sensing device 15. In this case, since the shutter unit 14 is kept closed, naturally, light incident into the image sensing device 15 is only the light from the LEDs 17a and 17b. Hence, light amounts incident on near the boundary between a left half area and a right half area become almost equal to each other, and the difference between outputs of the two channels expresses the imbalanced amount between the channels.

When it is detected that the fetching of image data is completed at step S174, the LEDs 17a and 17b are turned off at step S175.

At this time, in the imbalanced amount calculating circuit 116, the imbalanced amount between two channels has been detected with any one of the methods described in the first, fifth, and sixth embodiments. In addition, computing the offset data OF1 and OF2 and/or the gain data GN1 and GN2 for equalizing the output levels of the two channels have been completed. In the ninth embodiment, the operation of the imbalanced amount calculating circuit 116 is stopped. Then, the values (limiting values) obtained by giving certain predetermined allowance to the offset data OF1 and OF2, and the gain data GN1 and GN2 are stored in the offset limiter circuit 168 and the gain limiter circuit 169 at step S176. In particular, assuming that the allowance of the offset is $\pm\alpha$ and that the allowance of the gain is $\pm\beta$, the limiting values of OF1 and OF2 are held as OF1 ±α and OF2 ±α, and the limiting values of GN1 and GN2 are held as GN1 ±β and GN2 ±β, respectively.

Next, at step S177, it is determined whether the release switch 25 for instructing to start main image sensing operation is operated by the user. If it is determined that the release switch 25 is not operated, the process returns to the step S170 again to repeat the operation to the step S176.

It should be noted that, in the case where the predetermined switch of step S170 is a self timer switch and the like of the camera 1, it is also possible to perform step S178 just after step S176 without performing the determination of the release switch 25 at step S177.

Whereas, if it is determined that the operation of the release switch 25 is performed at the step S177, the process goes to step S158. The CPU 117 controls to open the shutter unit 14 through the control circuit 121. At step S179, the usual image sensing operation by the image sensing device 15 is simultaneously started by giving a predetermined trigger signal to the TG/SSG 101.

Then, at step S180, the operation of an imbalanced amount calculating circuit 116 is started, and an imbalanced amount between two signal outputs AD-CH1 and AD-CH2 from the image sensing device 15 is computed similarly to the step 173. However, since the shutter 14 is opened here and the LEDs 17a and 17b are off, the imbalanced amount of the image during image sensing operation is computed.

When it is detected that the fetching of image data is completed at step S181, the CPU 117 controls to close the shutter unit 14 at step S182.

At this time, in the imbalanced amount calculating circuit 116, the imbalanced amount between two channels has been detected using the above-described method, and, computing the offset data OF1 and OF2 and/or the gain data GN1 and GN2 for equalizing the output levels of two channels have been completed. Then, the operation of the imbalanced amount calculating circuit 116 is stopped at step S183, and the result is saved (fixed). In the ninth embodiment, values of the offset data OF1 and OF2 and the gain data GN1 and GN2 that are obtained in this manner are restricted by the limiting values set in advance as the offset limiter circuit 168 and the gain limiter circuit 169. If any of the offset data and gain data exceeds or is lower than its limit value (OF1±α, (OF2±α, GN1±β, or GN2±β), the limit value is set as correction data in corresponding one of the offset adjusting circuits 111 and 110, and gain adjusting circuits 113 and 112. The reason why correction data is set within the ranges of limit values is, for example, erroneous correction data may be computed in a case where an image of a high frequency exists near the boundary in the image. However, it is possible to perform stable imbalance adjustment by restricting correction data within the ranges of limit values.

The image data is temporarily stored in memory 107 and 109 through the memory controllers 106 and 108. The reading of this image data from the memory 107 and 109 is started so as to start image processing at the following step S184. Then, as described above, the correction to the read image obtained in usual image sensing operation is performed using the correction data of the adjustment circuits 111 and 110 and gain adjusting circuits 113 and 112.

It should be noted that, in the above-described ninth embodiment, the procedure for computing the imbalanced amount according to the predetermined switch operation similarly to the above-described eighth embodiment is described. However, the present invention is not restricted to this. The operation from step S170 to step S176 can be also controlled, for example, as in the above-described first embodiment so that the calibration mode is selected with the mode setting unit 118.

As described above, according to the ninth embodiment, since the imbalance is adjusted using an actually sensed image, more natural correction can be performed. Further, since the limiting values of correction values are obtained in advance and the correction values within the ranges of the limiting values are used, it is possible to perform stable adjustment regardless of the contents of the picture.

[Other Embodiment]

The present invention can be applied to a system constituted by a plurality of devices (e.g., host computer, interface, and camera head) or to an apparatus comprising a single device (e.g., digital still camera, and digital video camera).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

The present invention is not limited to the above embodiments and various changes and modifications can be made within the spirit and scope of the present invention. Therefore to apprise the public of the scope of the present invention, the following claims are made.

What is claimed is:

1. An image sensing apparatus comprising:
   an image sensing device having an image sensing area which is divided into a plurality of image sensing sections each including a plurality of pixels which generate electric signals corresponding to amounts of incident light, and a plurality of output units respectively outputting the electric signals of said plurality of image sensing sections to outside of said image sensing device;

a shutter adapted to open and close an optical path of incoming light to said image sensing device;

a light source which emits light to at least a part of said image sensing area of said image sensing device so that the light is projected onto said plurality of image sensing sections;

a controller that controls said shutter to close the optical path and controls said light source to emit light while said shutter closes the optical path; and a correction unit that corrects level differences, owing to characteristic difference of said plurality of output units, between the electric signals from said plurality of image sensing sections with the optical path opened on the basis of electric signals outputted by said plurality of output units with the optical path closed and said light source emitting light.

2. The image sensing apparatus according to claim 1, further comprising a light guide that is installed near said light source and projects luminous flux to said image sensing sections of said image sensing device.

3. The image sensing apparatus according to claim 2, wherein a part of said shutter is used as the light guide.

4. The image sensing apparatus according to claim 3, wherein a screening member of said shutter is used as a light guide.

5. The image sensing apparatus according to claim 2, wherein an optical element arranged between said shutter and said image sensing device is used as a light guide.

6. The image sensing apparatus according to claim 5, wherein the optical element is a protecting member that protects said image sensing sections of said image sensing device.

7. The image sensing apparatus according to claim 5, wherein the optical element is a low pass filter.

8. The image sensing apparatus according to claim 1, further comprising a setting unit that sets a correction parameter for correcting level difference between the electric signals from said plurality of image sensing sections with the optical path opened on the basis of electric signals outputted by said plurality of output units with the optical path closed, wherein said correction unit performs the correction of level difference using the correction parameter set by said setting unit.

9. The image sensing apparatus according to claim 8, wherein said correction unit has a plurality of processors which respectively process the electric signals output from said plurality of output units of said image sensing device, and perform the correction of level difference using the correction parameter set by said setting unit.

10. The image sensing apparatus according to claim 8, wherein the correction parameter is a ratio between the electric signals.

11. The image sensing apparatus according to claim 8, wherein the correction parameter is a difference between the electric signals.

12. The image sensing apparatus according to claim 8, further comprising: a switch that switches whether or not to operate said setting unit; and memory which stores the set correction parameter when said setting unit is operated.

13. The image sensing apparatus according to claim 1, further comprising a combining unit which combines electric signals of the plurality of image sensing sections corrected by said correction unit.

14. A control method for an image sensing apparatus that comprises an image sensing device having an image sensing area which is divided into a plurality of image sensing sections each including a plurality of pixels which generate electric signals corresponding to amounts of incident light and a plurality of output units respectively outputting the electric signals of said plurality of image sensing sections to outside of said image sensing device, a shutter adapted to open and close an optical path of incoming light to said image sensing device, and a light source which emits light to at least a part of said image sensing area of said image sensing device so that the light is projected onto said plurality of image sensing sections, comprising:

a closing step of closing an optical path of incoming light by the shutter;

a light emitting step of emitting light by the light source with the optical path closed; and a correction step of correcting level difference, owing to characteristic difference of said plurality of output units, between electric signals that are obtained from said plurality of image sensing sections with the optical path opened on the basis of electric signals outputted by the plurality of output units with the optical path closed and said light source emitting light.

15. The method according to claim 14, further comprising a combining step of combining the electric signals of the plurality of image sensing sections that are corrected at the correcting step.

16. The method according to claim 14, further comprising a setting step of setting a correction parameter for correcting level difference between the electric signals from said plurality of image sensing sections with the optical path opened on the basis of electric signals outputted by said plurality of output units with the optical path closed, wherein, in said correction step, the correction of level difference using is performed using the correction parameter set by said setting step.

17. The method according to claim 16, wherein said correction step includes a processing step of separately processing the electric signals output from the plurality of output units of said image sensing device, wherein, in said processing step, the correction of level difference between the electric signals is performed using the correction parameter set in said setting step.

18. The method according to claim 16, wherein the correction parameter is a ratio between the electric signals.

19. The method according to claim 16, wherein the correction parameter is a difference between the electric signals.

20. The method according to claim 16, further comprising: a switching step of switching whether or not to perform said setting step; and a storing step of storing the correction parameter when said setting step is performed.

* * * * *

UNITED STATES PATENT AND TRADEMARK OFFICE
CERTIFICATE OF CORRECTION

PATENT NO.        : 7,106,370 B2
APPLICATION NO.   : 09/972995
DATED             : September 12, 2006
INVENTOR(S)       : Shiomi et al.

It is certified that error appears in the above-identified patent and that said Letters Patent is hereby corrected as shown below:

ON THE TITLE PAGE:
At Item (56), References Cited, Foreign Patent Documents, Page 2,
"JP 7-38812  2/1995" should be deleted.

ON THE TITLE PAGE:
At Item (75), Inventors, "Yasuhiro Shiomi, Tokyo (JP);" should read --Yasuhiko Shiomi, Tokyo (JP);--.

Figure 17:
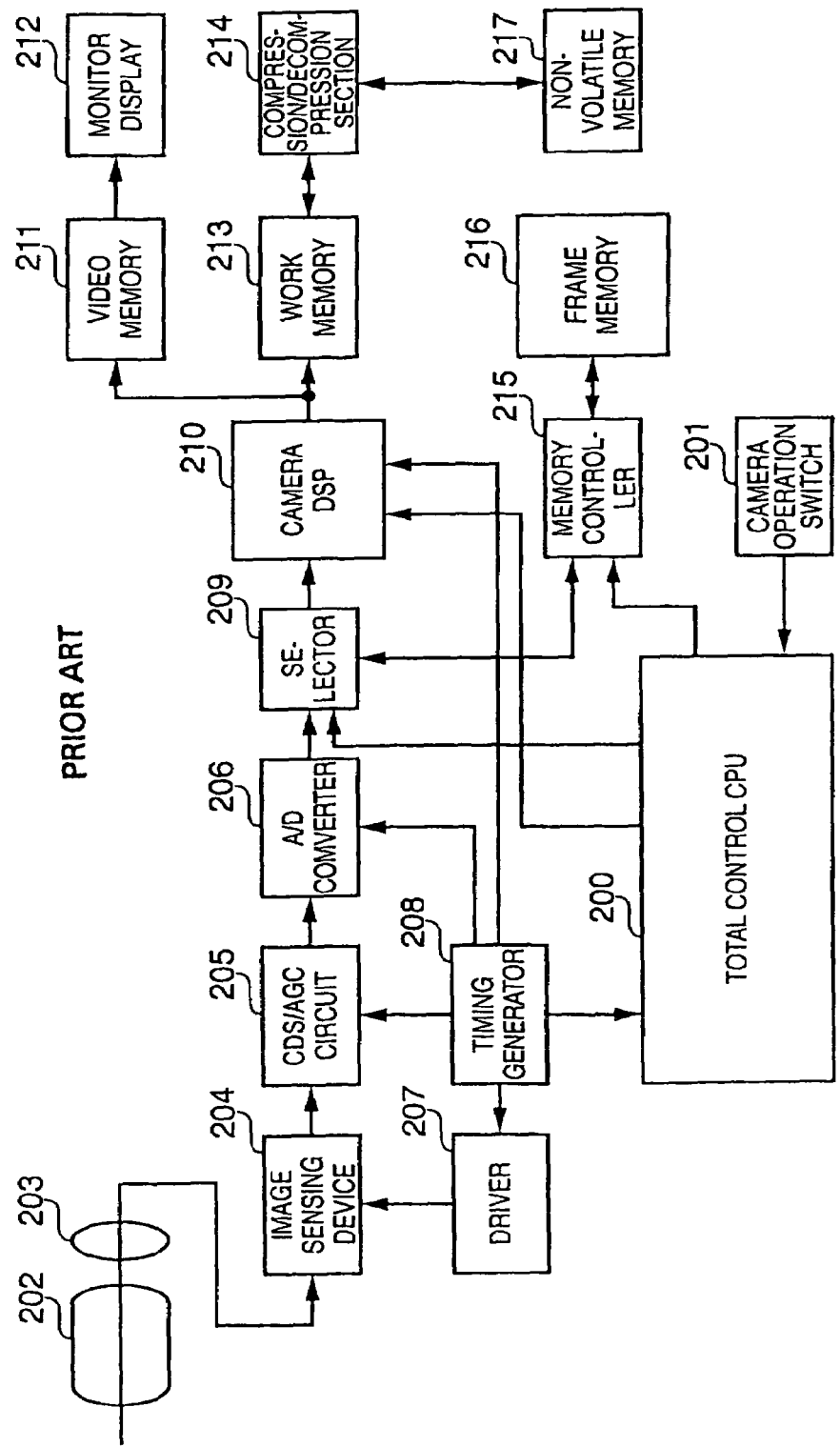
FIG. 17 is a block diagram showing the entire structure of a conventional camera system.

IN THE DRAWINGS:
Sheet No. 5, Figure 5, in element 111, "ADJUSTIG" should read --ADJUSTING--.
Sheet No. 14, Figure 14, in step S156, "IMBALANSED" should read --IMBALANCED--.
Sheet No. 17, Figure 17, in element 206, "COMVERTER" should read --CONVERTER--.

COLUMN 3:
Line 3, "adjust" should read --adjusts--.
Line 6, "according" should read --accordance--.
Line 9, "coincides" should read --coincide--.
Line 19, "senses" should read --sensing--.

COLUMN 4:
Line 20, "comprises" should read --comprise--.

COLUMN 6:
Line 36, "designed" should read --designed to be--.
Line 51, "directs" should read --direct--.

COLUMN 7:
Line 2, "reach" should read --thus reaching--.
Line 51, "devices" should read --device--.

COLUMN 8:
Line 2, "responsive" should read --response--.
Line 54, "is" should read --are--.

COLUMN 9:
Line 33, "calculation" should read --calculations--.

UNITED STATES PATENT AND TRADEMARK OFFICE
CERTIFICATE OF CORRECTION

PATENT NO.      : 7,106,370 B2
APPLICATION NO. : 09/972995
DATED           : September 12, 2006
INVENTOR(S)     : Shiomi et al.

It is certified that error appears in the above-identified patent and that said Letters Patent is hereby corrected as shown below:

COLUMN 10:
Line 33, "an" should be deleted, and "the both" should read --both of the--.
Line 34, "describing" should read --described--.

COLUMN 13:
Line 16, "adjustment" should read --adjustments--.

COLUMN 17:
Line 6, "ment" should read --ments--.
Line 59, "(Y direction) are" should read --(Y direction).--.
Line 60, "shown by respectively." should be deleted.

COLUMN 18:
Line 43, "is" should read --be--.
Line 44, "is" should read --be--.

COLUMN 19:
Line 7, "adjustment" should read --adjustments--.

COLUMN 20:
Line 4, "of" should be deleted.
Line 32, "amounts" should read --amount--.

COLUMN 25:
Line 11, "difference" should read --differences--.

UNITED STATES PATENT AND TRADEMARK OFFICE
CERTIFICATE OF CORRECTION

PATENT NO. : 7,106,370 B2
APPLICATION NO. : 09/972995
DATED : September 12, 2006
INVENTOR(S) : Shiomi et al.

It is certified that error appears in the above-identified patent and that said Letters Patent is hereby corrected as shown below:

COLUMN 26:
Line 56, "the" should read --the set--.

Signed and Sealed this

Thirteenth Day of November, 2007

JON W. DUDAS
*Director of the United States Patent and Trademark Office*